United States Patent
Schmitt et al.

(10) Patent No.: US 12,461,790 B2
(45) Date of Patent: Nov. 4, 2025

(54) SYSTEM AND METHOD FOR AUTO-CLUSTERING OF CLUSTERABLE SERVICES

(71) Applicant: Net-Thunder, LLC, Wheeling, IL (US)

(72) Inventors: Parker John Schmitt, Winnetka, IL (US); Neil Benjamin Semmel, Chicago, IL (US); Cameron Tyler Spry, Clarksville, IN (US); Arianna Osar, Wheeling, IL (US); Kevin Cammack, Wheeling, IL (US); Alec Ari, Wheeling, IL (US)

(73) Assignee: Net-Thunder, LLC, Wheeling, IL (US)

( * ) Notice: Subject to any disclaimer, the term of this patent is extended or adjusted under 35 U.S.C. 154(b) by 919 days.

(21) Appl. No.: 17/505,415

(22) Filed: Oct. 19, 2021

(65) Prior Publication Data

US 2022/0121502 A1   Apr. 21, 2022

Related U.S. Application Data

(60) Provisional application No. 63/093,691, filed on Oct. 19, 2020.

(51) Int. Cl.
*G06F 9/50* (2006.01)
*G06F 8/60* (2018.01)
(Continued)

(52) U.S. Cl.
CPC .............. *G06F 9/5072* (2013.01); *G06F 8/60* (2013.01); *G06F 9/5083* (2013.01);
(Continued)

(58) Field of Classification Search
None
See application file for complete search history.

(56) References Cited

U.S. PATENT DOCUMENTS

| 6,424,991 B1 | 7/2002 | Gish |
|---|---|---|
| 7,222,147 B1 | 5/2007 | Black et al. |

(Continued)

FOREIGN PATENT DOCUMENTS

| JP | 2015-530647 A | 10/2015 |
|---|---|---|
| WO | 2010114855 A1 | 10/2010 |

(Continued)

OTHER PUBLICATIONS

Gunasekaran et al., "Multiverse: Dynamic VM Provisioning for Virtualized High Performance Computing Clusters", arxiv.org, Jun. 22, 2020, 13 pages.

(Continued)

*Primary Examiner* — Qing Yuan Wu
(74) *Attorney, Agent, or Firm* — Thompson Coburn LLP

(57) ABSTRACT

A system can be configured to automatically deploy clusters of clusterable services. For example, controller can deploy a plurality of copies of an application, and these applications can interdepend on each other. The controller can also configure a scheduler to manage (which may include load balancing) these applications. A service template used by the controller can include clustering rules, and these clustering rules can tell the controller how to connect those services. The clustering rules can be a set of logic instructions and/or templates that provide for the deployment of a service to a plurality of resources. Coupling instructions in the clustering rules define the coordination and interaction of separately booked physical and/or virtual resources and set up dependencies. The clustering rules define the use of information to scale up or scale down resources being used by a service.

35 Claims, 20 Drawing Sheets

(51) Int. Cl.
  *G06F 9/48*       (2006.01)
  *H04L 41/5041*    (2022.01)
  *H04L 41/5054*    (2022.01)

(52) U.S. Cl.
  CPC ........ *H04L 41/5054* (2013.01); *G06F 9/4881* (2013.01); *H04L 41/5041* (2013.01)

(56) References Cited

U.S. PATENT DOCUMENTS

| | | |
|---|---|---|
| 7,730,259 B2 | 6/2010 | Taguchi et al. |
| 7,756,954 B2 | 7/2010 | Schmidt et al. |
| 8,219,724 B1 | 7/2012 | Caruso et al. |
| 8,522,005 B2 | 8/2013 | Mahmoud et al. |
| 8,819,650 B2 | 8/2014 | Barcia et al. |
| 9,148,465 B2 | 9/2015 | Gambardella et al. |
| 9,495,371 B2 | 11/2016 | Fortune et al. |
| 10,592,290 B2 | 3/2020 | Cui et al. |
| 2004/0098371 A1 | 5/2004 | Bayliss et al. |
| 2006/0080285 A1 | 4/2006 | Chowdhuri |
| 2007/0162810 A1 | 7/2007 | Sato et al. |
| 2007/0245142 A1 | 10/2007 | Rios et al. |
| 2008/0127172 A1 | 5/2008 | Dawson et al. |
| 2009/0113195 A1 | 4/2009 | Mohrmann et al. |
| 2009/0113198 A1 | 4/2009 | Liu et al. |
| 2010/0223385 A1 | 9/2010 | Gulley et al. |
| 2010/0287363 A1 | 11/2010 | Thorsen |
| 2012/0030442 A1 | 2/2012 | Nakanishi et al. |
| 2013/0205292 A1 | 8/2013 | Levijarvi |
| 2015/0186124 A1 | 7/2015 | Hoy et al. |
| 2015/0207625 A1 | 7/2015 | Sathaye et al. |
| 2017/0003950 A1 | 1/2017 | Newell et al. |
| 2017/0257432 A1 * | 9/2017 | Fu ...................... H04L 67/1014 |
| 2018/0060051 A1 | 3/2018 | Ramalingam et al. |
| 2019/0334909 A1 | 10/2019 | Schmitt et al. |

FOREIGN PATENT DOCUMENTS

| | | | |
|---|---|---|---|
| WO | WO-2019113553 A1 * | 6/2019 | ........... G06F 21/575 |
| WO | 2020252088 A1 | 12/2020 | |

OTHER PUBLICATIONS

Sayfan, "Mastering Kubernetes", May 2007, Retrieved from the Internet URL: http://196.189.45.87/bitstream/123456789/40210/2/115.Gigi%20Sayfan.pdf.

Extended European Search Report for EP Application 21883720.1 dated Jul. 10, 2024.

Office Action for Japanese Application 2023-523663 dated Aug. 26, 2025.

* cited by examiner

SYSTEM AND METHOD FOR AUTO-CLUSTERING OF CLUSTERABLE SERVICES

CROSS-REFERENCE AND PRIORITY CLAIM TO RELATED PATENT APPLICATION

This patent application claims priority to U.S. provisional patent application 63/093,691, filed Oct. 19, 2020, and entitled "System and Method for Auto-Clustering of Clusterable Services", the entire disclosure of which is incorporated herein by reference.

STATEMENT REGARDING FEDERALLY SPONSORED RESEARCH OR DEVELOPMENT

This invention was made with government support under Department of Energy Grant No. DE SC0021825 awarded by the United States Department of Energy. The government has certain rights in the invention.

INTRODUCTION

As the volumes of data generated by and consumed by computer users, particularly businesses, continue to increase, there is a technical need in the art for widespread deployments of high performance computing (HPC) systems. The appeal of HPC is not just a reduction in computational convergence through parallelization, but also access to massive data storage bandwidth, the ability to schedule compute hardware such as CPUs and graphics processor units (GPUs) for different tasks, integration with Artificial Intelligence (AD/machine learning (ML) components, and efficient management of compute hardware resources. In addition, there is a convergence of HPC-powered computer-aided engineering (CAE)/engineering design automation (EDA) and AI where simulations generate huge amounts of data that recursively feed into AI models to analyze and identify optical nets, logic placements, and process alignments. This integration of EDA and AI/ML accelerates product development and improves quality, but requires a runtime environment that is stable, simple, and which provides optical performance across complex hardware environments.

HPC has traditionally been characterized by low latency, high throughput, massive parallelism, and massively distributed systems. For traditional scientific users with multimillion dollar compute budgets, the cost of information technology (IT) and expert software development can be just a small fraction of a percentage of the cost of compute time, which means that ease-of-setup and ease-of-use have not been adequately designed into the systems. The end result is that conventional HPC has been hard to use and requires expensive people to run.

However, widespread deployment of HPC poses a challenge for many companies as moving from a monolithic workstation-based or bespoke computing-based platform to an HPC platform is a non-trivial task. That is to say, it is technically challenging to make HPC applications accessible to non-expert users who may possess limited IT budgets and average IT management capabilities.

As a solution to these technical challenges, the inventors disclose techniques for automating a deployment of clusters of clusterable services. A system can be said to "cluster" a service when it runs multiple instances of that service, and the multiple instances work together and can pass instructions to each other. For example, consider a system that includes 20 servers that are going to run a data mining application. Each of these servers will have to interact with each other, and a resource is needed to schedule these interactions. This coordination of clustered services can be a daunting technical challenge, particularly for systems that are running services on bare metal (rather than using virtualization). Bare metal deployment of clustered services is advantageous for services to be run on customer coprocessors or GPUs. The term "instance" as used herein refers to a service deployed on a resource, where the resource may include but is not limited to physical, virtual, or container resources. A cluster can have multiple instances that belong to the cluster.

These techniques can be used as a tool for seamless scaling of HPC applications from the desktop to computer systems with massively parallel environments, which may include deployments across GPU clusters and mixed hardware with GPU support. In an example embodiment, the computer systems described by the inventors in U.S. Pat. App. Pub. 2019/0334909 and WIPO Pub. WO 2020/252088, the entire disclosures of which are incorporated herein by reference, can be extended to include cluster management services to provide a path for commercially viable automatic configuration of clusterable applications in HPC.

Through such example embodiments, computer systems employing clusters can be used to provide high performance computing as a service (HPCaaS). HPCaas is a hybrid of cloud computing and HPC that makes HPC accessible to many users at affordable costs and in relatively small bundles of computer time. While traditional HPC systems often serve a single application at a given time, HPCaaS can include the capability of using clustered services and storage as resource pools, a web interface for users to submit their job requests, and smart scheduling that can schedule multiple different applications simultaneously on a given cluster taking into consideration the different application characteristics for maximum overall productivity.

These and other features and advantages of example embodiments of the invention are described in greater detail below.

DETAILED DESCRIPTION OF EXAMPLE EMBODIMENTS

Figure 1:
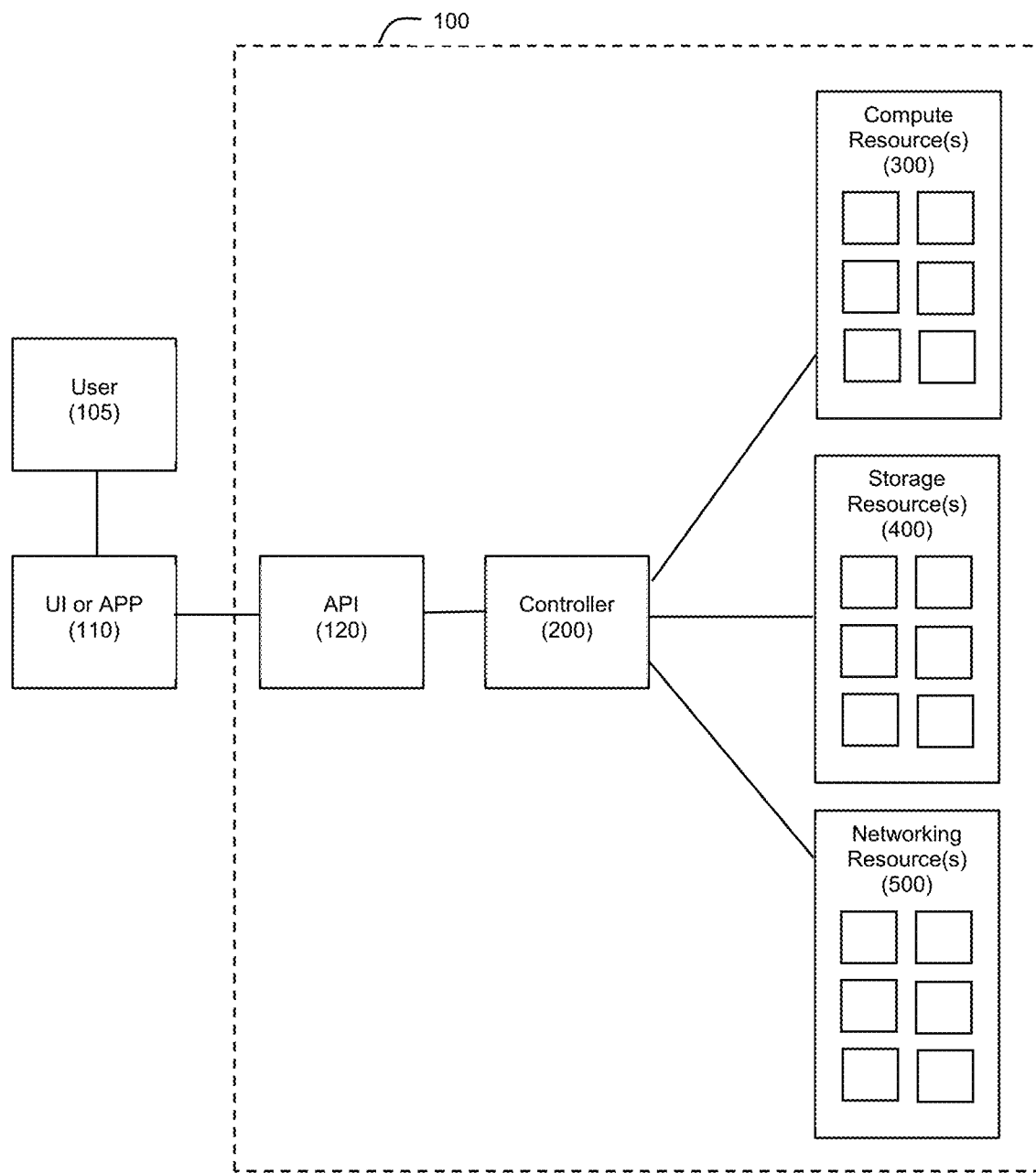
FIG. 1 is a schematic illustration of a system according to an example embodiment.

FIG. 1 shows an example computer system 100 that can be used in connection with implementing the clustering techniques described herein.

Example System Components

A user interface (UI) 110 is shown coupled through an application program interface (API) application 120 to controller 200. The API 120 may reside on a standalone physical or virtual server, although this need not be the case. The API 120 may comprise one or more API applications, which may be redundant and/or operate in parallel. The API 120 receives requests to configure system resources, parses the requests, and passes them to the controller 200. The API 120 receives one or more responses from the controller 200, parses the response(s), and passes them to the UI (or application) 110. Alternatively or additionally, an application or service may communicate with the API 120.

Controller 200 may be deployed on or more processors and one or more memories to implement any of the control operations discussed herein. Instructions for execution by the processor(s) to carry out such control operations can be resident on a non-transitory computer-readable storage medium such as processor memory. The controller 200 is coupled to one or more compute resources 300, storage resources 400 and networking resources 500. Accordingly, the system may include a pool of multiple compute resources 300, multiple storage resources 400, and/or multiple networking resources 500 that the controller 200 can set up and control within the system 100. The resources 300, 400, 500 may reside on a single node, although this need not be the case as they could reside in multiple nodes within the system 100 (or they may reside in various combinations on multiple nodes). Also, one or more of the resources 300, 400, 500 may be virtual. A physical device may comprise one or more or each of the resource types including but not limited to compute resources 300, storage resources 400, and networking resources 500. As noted above, resources 300, 400, 500 may comprise pools of such resources whether or not at different physical locations, and whether or not virtual. Bare-metal compute resources may also be used to enable the use of virtual or container compute resources.

In addition to the known definition of a node, a node as used herein may be any system, device or resource connected to a network(s) or other functional unit that performs a function on a stand alone or network connected device. A node may also include but is not limited to, for example, a server, a service/application/plurality of services on a physical or virtual host, a virtual server, and/or a plurality or singular service on a multi-tenant server or running inside a container.

The one or more processors on which controller 200 is deployed may take the form of one or more physical or virtual controller servers, which may also be redundant and/or operate in parallel. Controller 200 may run on a physical or virtual host that is serving as a compute host. As an example, controller 200 may comprise a controller that runs on a host that is also serving other purposes, for example due to it having access to sensitive resources. Controller 200 receives requests from the API 120, parses requests, makes appropriate tasking for and instructs other resources, monitors and receives information from the resources, maintains the state of the system and a history of changes, and may communicate with other controllers that may exist in the system 100. The controller 200 may also contain the API 120.

A compute resource 300 as defined herein may comprise a single compute node or a resource pool with one or more compute nodes, real or virtual. The compute resource 300 may comprise one or more physical or virtual machines or container hosts, that may host one or more services or run one or more applications. A compute resource 300 may also be on hardware designed for multiple purposes including but not limited to, computing, storage, caching, networking, and/or specialized computing, where such hardware may include but is not limited to GPUs, ASICs, co-processors, CPUs, FPGAs, and other specialized computing hardware. Such devices may be added with a PCI express switch or similar device and may be added dynamically in such a manner. A compute resource 300 may comprise or may run one or more hypervisors or container hosts that contains a plurality of different virtual machines that run services or applications or can be virtual compute resources. While the compute resource's emphasis may be on providing compute functions, it may also comprise data storage and/or networking capabilities.

A storage resource 400 as defined herein may comprise a storage node or a pool or storage nodes. The storage resource 400 may comprise any data storage medium, for example, fast, slow, hybrid, cached and/or RAM. A storage resource 400 may comprise one or more types of network, machine, device, nodes or any combination thereof, which may or may not be directly attached to other storage resources. According to aspects of an example embodiment the storage resource(s) 400 may be may be bare-metal or virtual or a combination thereof. While the storage resource's emphasis may be on providing storage functions, it may also comprise compute and/or networking capabilities.

The networking resource(s) 500 may comprise a single networking resource, a plurality of networking resources or a pool of networking resources. Networking resource(s) 500 may comprise physical or virtual device(s), tool(s), switches, routers or other interconnects between system resources, or applications for managing networking. Such system resources may be physical or virtual, and may include computing, storage, or other networking resources. A networking resource 500 may provide connections between outside networks and applications networks and may host core network services including but not limited to Domain Name System (DNS or dns), Dynamic Host Configuration Protocol (DHCP), subnet management, layer 3 routing, Network Address Translation (NAT), and other services. Some of these services may be deployed on compute resources 300, storage resources 400, or networking resources 500 on physical or virtual machines. The networking resources 500 may utilize one or more fabrics or protocols including but not limited to Infiniband, Ethernet, Remote Direct Memory Access (DMA) over Converged Ethernet (RoCE), fibre channel and/or Omnipath, and may contain interconnects between a plurality of fabrics. A networking resource 500 can be software-defined networking (SDN) capable, although this need not be the case. The controller 200 may be able to directly alter networking resources 500 using SDNs, Virtual Local Area Networks (VLANs), or the like to configure topology of computer systems such as IT systems. While the networking resource's emphasis may be on providing networking functions, it may also comprise compute and/or storage capabilities.

An applications network as used herein means a networking resource 500, or any combination of networking resources 500, to connect or couple applications, resources, services, and/or other networks, or to couple users and/or clients to applications, resources, and/or services. An application network may comprise a network used for servers to communicate with other application servers (physical or virtual) and to communicate with clients. Applications networks may communicate with machines or networks outside the system 100. For example, an applications network may connect a web frontend to a database. A user may connect to a web application through the internet or another network that may or may not be managed by a controller 200.

According to an example embodiment, the compute, storage and networking resources 300, 400, 500, respectively, may be automatically added, removed, set up, allocated, reallocated, configured, reconfigured and/or deployed by the controller 200. According to an example embodiment, additional resources may be added to the resource pools. Examples of techniques for adding, removing, setting up, allocating, reallocating, configuring, reconfiguring, and deploying such resources are described in greater detail in the above-referenced and incorporated U.S. Pat. App. Pub. 2019/0334909 and WIPO Pub. WO 2020/252088.

FIG. 1 shows that a user 105 may access and interact with the system 100 through a user interface 110. FIG. 1 also shows that an application (app) may also or alternatively access and interact with the system 100. For example, a user 105 or application may send requests to the controller 200 via API 120 where such requests may include but are not limited to: a request to build an IT system; a request to build an individual stack in an IT system; a request to create a service or application; a request to migrate a service or application; a request to change a service or application; a request to remove a service or application; a request to clone a stack onto another stack on a different network; a request to create, add, remove, set up, configure, and/or reconfigure a resource or system component. Examples of techniques for carrying out requests such as these are described in the above-referenced and incorporated U.S. Pat. App. Pub. 2019/0334909 and WIPO Pub. WO 2020/252088.

The system 100 of FIG. 1 may comprise a server with connections or other communication interfaces to various elements, components or resources which may be either physical or virtual or any combination thereof. According to a variation, the system 100 illustrated in FIG. 1 may comprise bare metal server with connections.

As described in more detail in the above-referenced and incorporated U.S. Pat. App. Pub. 2019/0334909 and WIPO Pub. WO 2020/252088, the controller 200 may be configured to power on resources or components, to automatically set-up, configure, and/or control boot up of resources, to add resources, to allocate resources, to manage resources, and/or to update available resources. The power up process may begin with powering the controller 200 so that the order of devices being booted may be consistent and not dependent on the user powering on devices. The process may also involve detection of powered up resources.

Figure 2:
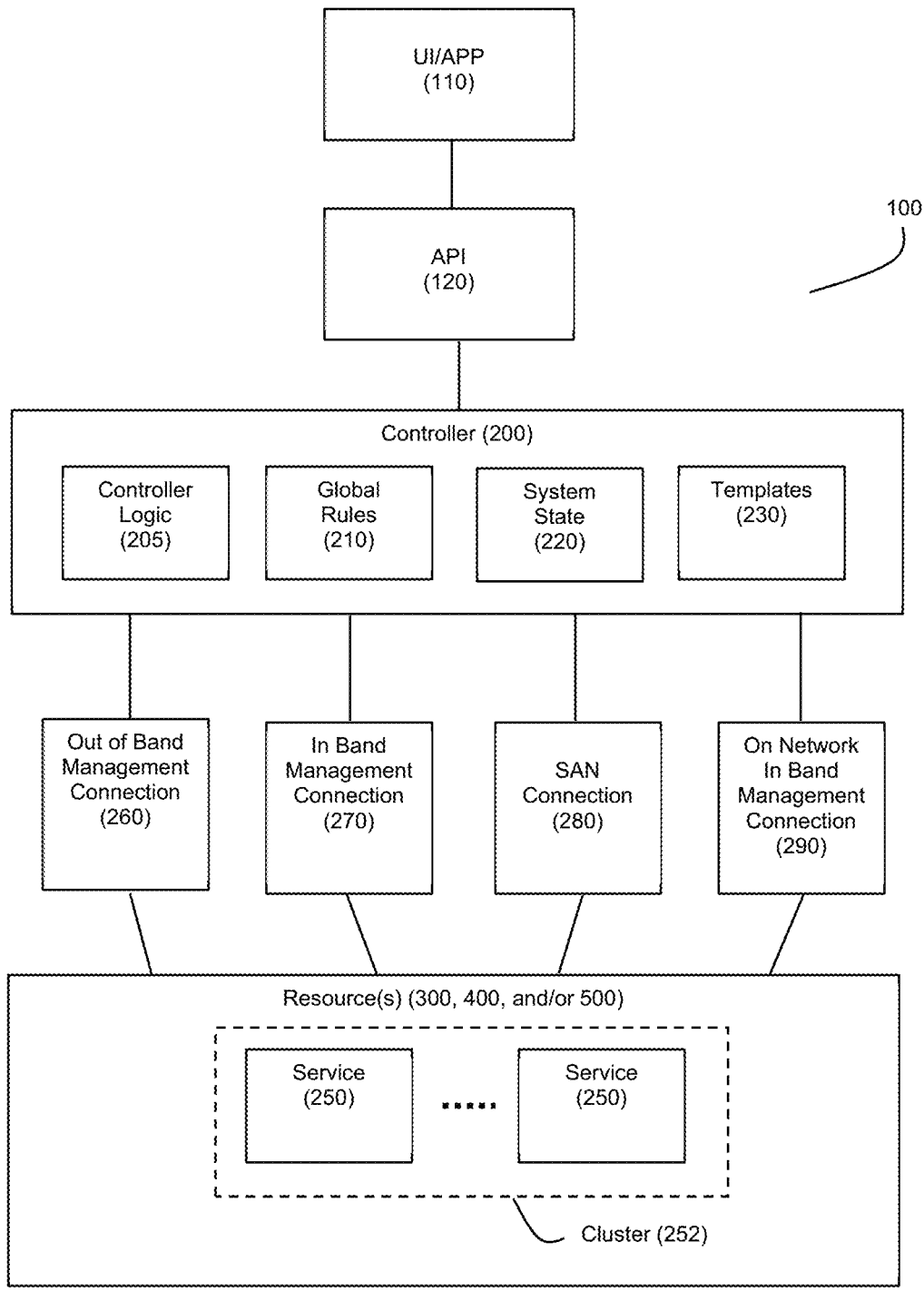
FIG. 2 is a schematic illustration of an example controller for the system of FIG. 1.

FIG. 2 shows additional aspects of the controller 200 within system 100, where the controller 200 includes controller logic 205, global system rules 210, system state 220, and templates 230.

The global system rules 210, among other things, may declare the rules that set up, configure, boot, allocate and manage the resources that may include compute resources 300, storage resources 400, and networking resources 500. The global system rules 210 comprise minimum requirements for the system 100 to be in the correct or desired state. Those requirements may comprise tasks expected to be completed and an updatable list of expected hardware needed to predictably build a desired system. An updatable list of expected hardware may allow the controller 200 to verify that needed resources (e.g., before starting rules or using templates) are available. The global system rules 210 may comprise a list of operations required for various tasks and corresponding instructions relating to the ordering of operations and tasks. For example, the rules 210 may specify the order to power components on, to boot resources, applications and services, dependencies, when to start different tasks, e.g., loading configuring, starting, reloading applications, or updating hardware. The rules 210 may also comprise one or more of: a list of resource allocations, e.g., required for applications and services; a list of templates that may be used; a list of applications to be loaded and how to configure; a list of services to be loaded and how to configure a list of application networks and which applications go with which networks; a list of configuration variables specific to different applications and user specific application variables; an expected state, which allows the controller 200 to check the system state 220 to verify the state is as expected and the results of each instruction are as expected; and/or a version list, comprising a list of changes to rules, (e.g. a snapshot) that may allow tracking of changes to rules and an ability to test or revert to different rules in different circumstances. The controller 200 may be configured to apply global system rules 210 to a system 100 on physical resources, virtual resources, or a combination of physical and virtual resources. Additional information about and examples of global system rules 210 that can be used by system 100 are described in the above-referenced and incorporated U.S. Pat. App. Pub. 2019/0334909 and WIPO Pub. WO 2020/252088.

The templates 230 may comprise a library of templates 230, and such templates 230 may include bare metal and/or service templates. A template 230 can have an association with a resource, application, or service; and it can serve as the recipe that defines how such a resource, application, or service is to be integrated into the system 100.

As such, a template 230 may comprise an established set of information that is used to create, configure, and/or deploy, a resource, or an application or service loaded on a resource. Such information may include but is not limited to: Kernels, initrd files, filesystems or filesystem images, files, configuration files, configuration file templates, information used to determine appropriate setups for different hardware and/or compute backends, and/or other available options for configuring the resources to power the application and operating system images that allow and/or facilitate the creation, booting or running of an application.

A template 230 may contain information that may be used to deploy applications on pluralities of supported hardware types/and or compute backends including but not limited to a plurality of physical server types or components, a plurality of hypervisors running on a plurality of hardware types, container hosts that may be hosted on a plurality of hardware types.

Templates 230 may derive boot images for applications or services that run on computing resources 300. The templates 230 and images derived from templates 230 may be used to create an application, deploy an application or service, and/or arrange resources for various system functions, which allow and/or facilitate the creation of an application. A template 230 may have variable parameters in files, file systems, and/or operating system images that may be overwritten with configuration options from either default settings or settings given from the controller 200. A template 230 may have configuration scripts used to configure an application or other resources and it may make use of configuration variables, configuration rules, and/or default rules or variables; these scripts, variables, and/or rules may contain specific rules, scripts, or variables for specific hardware or other resource specific parameters, e.g. hypervisors (when virtual), available memory. A template 230 may have files in the form of binary resources, compilable source code that results in binary resources or hardware or other resource-specific parameters, specific sets of binary resources or source code with compile instructions for specific hardware or other resource specific parameters, e.g. hypervisors (when virtual), available memory. A template 230 may comprise a set of information independent of what is being run on a resource.

A template 230 may comprise a base image. The base image may comprise a base operating system file system. The base operating system may be read only. The base image may also comprise basic tools of the operating system independent of what is being run. The base image may include base directories and operating system tools.

The template 230 may comprise a kernel. The kernel or a plurality of kernels may include an initrd or a plurality of kernels configured for different hardware types and resource types. Images may be derived from the templates 230 and loaded to one or more resources or deployed. A loaded image may also comprise boot files such as the kernels or initrd's of a corresponding template 230.

An image may comprise template filesystem information that may be loaded to a resource based on a template 230. A template filesystem may configure applications or services. A template filesystem may comprise a shared filesystem that is common to all resources, or to like resources, for example to save storage space where filesystems are stored or to facilitate the use of read only files. A template file system or image may comprise a set of files common to the services being deployed. The template file systems may be preloaded on the controller or downloaded. The template filesystems may be updated. A template file system may allow for relatively quicker deployment, as it may not require rebuilding. Sharing filesystems with other resources or applications may allow for reduction in storage, as files are not duplicated unnecessarily. This may also allow for easier recovery from failure, as only files that are different from the template filesystem need to be recovered.

Template boot files may comprise a kernel and/or initrd or a similar filesystem used to aid the booting process. The boot files may boot the operating system and set up the template file system. The initrd may comprise a small temporary filesystem with instructions on how to setup the template 230 so that it can boot.

A template 230 may further comprise template BIOS settings. The template BIOS settings may be used to set optional settings to run applications on a physical host. If used, then out of band management network 260 may be used to boot the resource or application. A physical host may boot resources or applications using the out of band management network 260 or a CDROM. The controller 200 may set application specific bios settings defined in such template 230. The controller 200 may use the out of band management network 260 to make direct bios changes through an API specific to a particular resource. The settings may be verified through the console and image recognition. Accordingly, the controller 200 may use the console features and make bios changes with a virtual keyboard and mouse. The controller 200 may also use a UEFI shell and may type directly into the console and may use image recognition to verify successful results, type in commands correctly, and ensure successful settings changes. If there is a bootable operating system available for BIOS changes or updates to specific BIOS versions the controller 200 may remotely load a disk image or an ISO boot an operating system run applications that update BIOSs and allow for configuration changes in a reliable manner.

A template 230 may further comprise a list of template-specific supported resources or a list of resources required for running specific applications or services.

A template image or a portion of the image or template 230 may be stored on the controller 200 or the controller 200 may move or copy it to a storage resource 400.

Additional information about and examples of templates 230 that can be used by system 100 are described in the above-referenced and incorporated U.S. Pat. App. Pub. 2019/0334909 and WIPO Pub. WO 2020/252088.

The system state 220 tracks, maintains, changes and updates the status of the system 100 including, but not limited to, resources such as compute resources 300, storage resources 400, and networking resources 500. The system state 220 may take the form of a database and may track available resources, which will tell the controller logic 205 if and what resources are available for implementation of the rules 210 and templates 230. The system state 220 may track used resources which allows the controller logic 205 to examine efficiency, utilize efficiencies, whether there is a need to switch for upgrading or other reason, such as to improve efficiencies or for priorities. The system state 220 may track what applications are running. The controller logic 205 may compare expected applications running versus actual applications running according to the system state 220, and whether there is a need to revise. The system state 220 may also track where applications are running. The controller logic 205 may use this information for purposes of evaluating efficiency, change management, updating, trouble-shooting, or audit trails. The system state 220 may track networking information, e.g., what networks are on or currently running or configuration values and history. The system state 220 may track a history of changes. The system state 220 may also track which templates 230 are used in which deployment based on the global system rules 210 that prescribe which templates 230 are used. The history may be used for auditing, alerting, change management, building reports, tracking versions correlated with hardware and applications and configurations, or configuration variables. The system state 220 may maintain a history of configurations for purposes of auditing, compliance testing or trouble-shooting.

Additional information about and examples of system state 220 that can be used by system 100 are described in the above-referenced and incorporated U.S. Pat. App. Pub. 2019/0334909 and WIPO Pub. WO 2020/252088.

The controller 200 includes controller logic 205 for managing all the information contained in the system state 220, templates 230, and global system rules 210. The controller logic 205 (which may take the form of an application), global system rules 210, system state 220, and templates 230 are managed by the controller 200 and may or may not reside on the controller 200. The controller logic 205, global system rules 210, system state 220, and templates 230 may be physical or virtual. And they may be distributed services, distributed databases, and/or files, although this need not be the case. The API 120 may be included with the controller logic 205.

The controller 200 may run a stand-alone machine and/or may comprise one or more controllers. The controller 200 may comprise a controller service or application and may run inside another machine. A controller machine may start up the controller service first to ensure orderly and/or consistent booting of the entire stack or group of stacks.

The controller 200 may control one or more stacks with compute, storage, and networking resources 300, 400, 500. Each stack may or may not be controlled by different subsets of rules within the global system rules 210. For example, there may be pre-production, production, development, testing stack, parallel, backup, and/or other stacks having different functions within a system.

The controller logic 205 may be configured to read and interpret global system rules 210 to achieve the desired system state. The controller logic 205 may be configured to use templates 230 according to the global rules 210 to build system components such as applications or services, and to allocate, add, or remove resources to achieve a desired state for system 100. The controller logic 205 may read the global system rules 210 develop a list of tasks to get to the correct state and issue instructions to fulfill the rules based on available operations. The controller logic 205 may contain logic for executing operations, e.g. start up system, add, remove, reconfigure resources; identify what is available to do. The controller logic 205 may check the system state 220 at start up time and at regular intervals to see if hardware is available and if available, may execute task. If the necessary hardware is not available, the controller logic 205 uses global system rules 210, templates 230, and available hardware from the system state 220 to present alternative options and amend the global rules 210 and/or system state 220 accordingly.

The controller logic 205 may know what variables are required, what a user needs to input to continue or a what user needs in the system 100 to function. The controller logic 205 may use the list of templates 230 from the global system rules 210 and compare to the templates required in the system state 220 to ensure required templates are available. The controller logic 205 may identify from system state 220, if resources on a list of template-specific supported resources are available. The controller logic 205 may allocate the resources, update the state 220, and go to the next set of tasks to implement the global rules 210. The controller logic 205 may start/run applications on allocated resources as specified in the global rules 210. The rules 210 may specify how to build an application from templates 230. The controller logic 205 may grab template(s) 230 and configure applications from variables. The template 230 can tell the controller logic 205 which kernel, boot files, filesystems and supported hardware resources are required. Then, the controller logic 205 can add the information concerning the application deployment to system state 220. After each instruction, controller logic 205 may check the system state 220 versus expected state of the global rules 210 to verify if the expected operation completed correctly.

Controller logic 205 may use versions according to version rules. The system state 220 may have a database correlating which rules version has been used in different deployments.

The controller logic 205 may include efficient logic to rule optimization and efficient order. The controller logic 205 may be configured to optimize resources. The information in the system state 220, rules 210, and templates 230 relating to applications that are running or are expected to be running, may be used by the controller logic 205 to implement efficiencies or priorities with respect to resources. Controller logic 205 may use information in "used resources" in the system state 220 to determine efficiency or a need to switch resources for upgrading, repurposing or other reason.

The controller 200 may check applications running according to the system state 220 and compare to the expected applications running of the global rules 210. If an application is not running, it may start it. If an application should not be running, it may stop it and reallocate resources if appropriate. The controller logic 205 may include a database of resource (compute, storage networking) specifications. The controller logic 205 may include logic to recognize resource types available to the system that can be used. This may be performed using out of band management network 260. The controller logic 205 may be configured to recognize new hardware using out of band management network 260. The controller logic 205 may also take the information from the system state 220 on the history of changes, rules used and versions, for purposes of auditing, building reports and change management.

The controller 200 communicates with the stack or resources by way of one or more of multiple networks, interconnects, or other connections through which the controller 200 can instruct the compute, storage, and networking resources to operate. Such connections may include: an out of band management connection 260; an in band management connection 270; a storage area network (SAN) connection 280, and an optional on network in band management connection 290.

The out of band management may be used by the controller 200 to detect, configure, and manage components of the system 100 through the controller 200. The out of band management connection 260 may enable the controller 200 to detect a resource which is plugged in and available, but not turned on. The resource when plugged in, may be added to the system state 220. Out of band management may be configured to load boot images, configure, and monitor resources belonging to the system 100. The out of band management may also boot temporary images for diagnostics of an operating system. The out of band management may be used to change BIOS settings, and may also use the console tools to run commands on a running operating system. The settings may also be changed by the controller 200 using to console, keyboard, and image recognition of video signals from a physical or virtual monitor port on a hardware resource such as a VGA, DVI or HDMI port and/or using the API provided by the out of band management, e.g. Redfish.

Out of band management as used herein may include but is not limited a management system able to connect to a resource or a node independent of the operating system and the main motherboard. The out of band management connection 260 may comprise a network or plurality of types direct or indirect connections or interconnects. Examples of out of band management connection types include but are not limited to IPMI, Redfish, SSH, telnet, other management tools, keyboard video and mouse (KVM) or KVM over IP, serial consoles, or USBs. Out of band management is a tool that may be used over a network, that may power on and off the node or resource, monitor temperatures and other system data; make BIOS and other low level changes that may be outside of the operating system's control; connect to a console and send commands; control inputs including but not limited to keyboard, mouse, monitor. Out of band management may be coupled to an out of band management circuit in a physical resource. Out of band management may connect a disk image as a disk that may be used for booting install media.

The management network or in band management connection 270 may allow the controller 200 to gather information on the compute, storage, networking or other resource, communicating directly to the operating system that the resource is running. Storage resources, compute resources or networking resources may comprise a management interface that interface with connections 260 and/or 270, whereby they may communicate with the controller 200 and tell the controller 200 what is running and what is available for resources and receive commands from the controller 200. An in band management network as used herein comprises a management network able to communicate with a resource, directly to the operating system of the resource. Examples of in band management connections 270 may include but are not limited to SSH, telnet, other management tools, serial consoles, or USBs.

While the out-of-band management is described herein as a physically or virtually separated network from the in band management network, they may be combined or may work in conjunction with each other for purpose of efficiencies as described in more detail herein. Accordingly out of band and in band management or aspects thereof may communicate through the same port of a controller or be coupled with a combined interconnect. Optionally one or more of connections 260, 270, 280, 290, may be separate or combined with other of such networks and may or may not comprise the same fabric.

In addition the compute resources, storage resources, and controller may or may not be coupled to a storage network via SAN connection 280 in a manner that the controller 200 can use the storage network to boot each resource. The controller 200 may send the boot images or other templates to a separate storage or other resource or other resource so that other resources can boot off of the storage or other resource. The controller 200 may instruct where to boot from in such situation. The controller 200 may power on a resource, instruct the resource from where to boot and how to configure itself. The controller 200 instructs the resource how to boot, what image to use, and where the image is located if that image is on another resource. The BIOS's resources may be pre-configured. The controller 200 may also or alternatively configure the BIOS through out of band management so that they will boot off the storage area network. The controller 200 may also be configured to boot an operating system from an ISO and enable the resource to copy data to local disks. The local disks may then subsequently be used for booting. The controller 200 may configure other resources including other controllers, in such a way that the resources can boot. Some resources may comprise an application that provides compute, storage, or networking function. In addition it is possible for the controller 200 to boot up a storage resource and then make the storage resource responsible for supplying the boot image of the subsequent resources or services. The storage may also be managed over a different network that is being used for another purpose.

Optionally, one or more of the resources may be coupled to an on network in band management connection 290. This connection 290 may comprise one or more types of in band management as described with respect to in band management connection 270. The connection 290 may connect the controller 200 to an applications network to make use of the networks or to manage them through in band management networks.

Automated Clustering of Services

The inventors disclose a number of different techniques that can be implemented by a system 100 to automate a deployment of one or more clusters 252 of clusterable services 250 (e.g., see FIG. 2).

Figure 3:
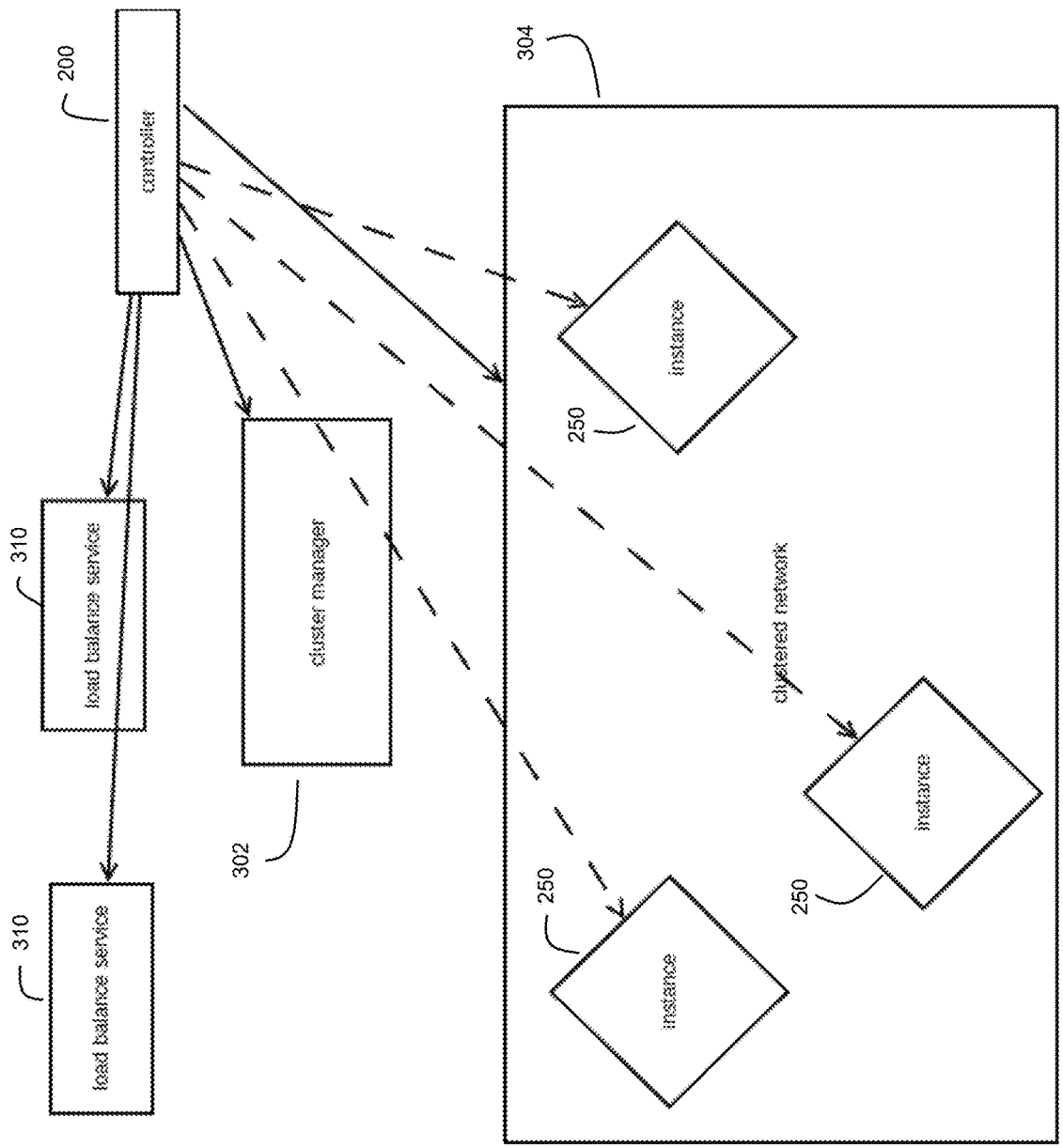
FIGS. 3 and 4 show example deployments of service instances in a clustered network.

For example, controller 200 can deploy a plurality of copies of an application (e.g., n copies of an application, where n can be an integer greater than 1), and these applications can interdepend on each other. These applications can take the form of services 250. The controller 200 can also configure a scheduler to manage (which may include load balancing 310 as shown by FIG. 3) these applications (see service instances 250 in FIG. 3). As an example, the scheduler can be a cluster manager 302 as shown by FIG. 3, where the cluster manager 302 can be a service that manages the cluster 252, manages load balancing, and/or manages other tasks to schedule those tasks and split up the processing load. Thus, the cluster manager 302 can act as a scheduler that send out tasks (something like SLURM), while other cluster managers 302 might be just in time configuring various hosts. Other services within the environment can then depend on a cluster 252 of services 250 rather than depend on just a single service.

Figure 4:
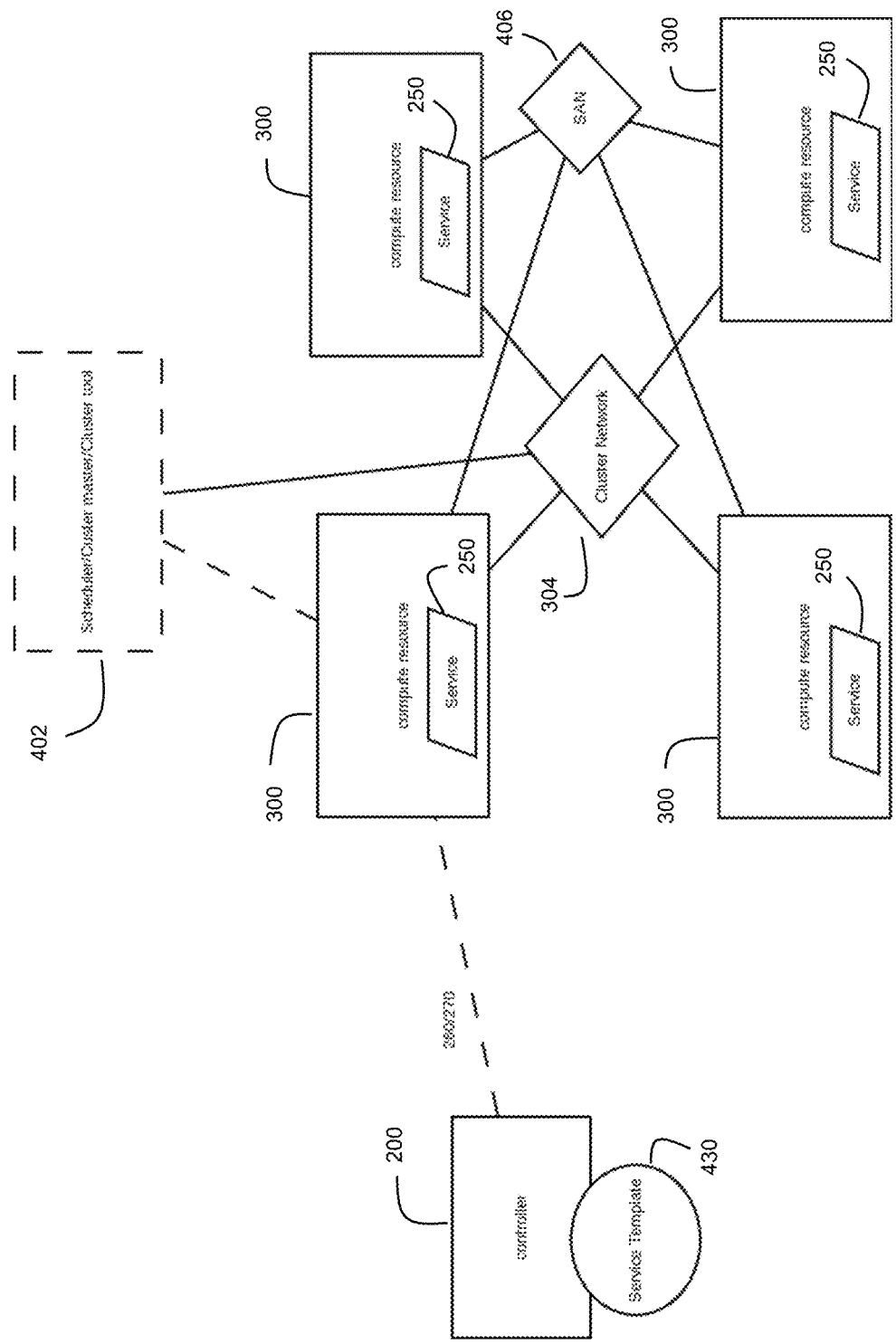

As shown by FIG. 4, a service template 430 is used by the controller 200. Service template 430 can be included among templates 230. The service template 430 can include clustering rules, and these clustering rules can tell the controller 200 how to connect those services. The clustering rules can be a set of logic instructions and/or templates that provide for the deployment of a service to a plurality of resources. Coupling instructions in the clustering rules define the coordination and interaction of separately booked physical and/or virtual resources and set up dependencies. The separate resources can include but are not limited to machines, physical, metal, virtual, and/or containers. The clustering rules define the use of information to scale up or scale down resources being used by a service. Additional details about example clustering rules are discussed below with reference to FIG. 9.

The dotted lines shown by FIG. 4 indicate connections that are made to each compute resource/service instance within the cluster. These connections can be physical or virtual. Also, if the controller 200 has to use software-defined networking (SDN) on a networking resource 500, the controller 200 can use out of band management on the SDN switch to cluster those services (see 260 in FIG. 4). For example, the OOB of the switch can connected to the controller 200 through serial console, and a vlan can be set on those ports. As another example, the controller 200 can set opensm (subnet manager for infiniband) either on the switch or somewhere else. The SDN can be a network only used for the clustered services 250 to talk to each other, and such a network configuration can make the system more secure with increased performance The clustering rules may specify a clustering tool 402 (e.g., Simple Linux Utility for Resource Management (SLURM)) which can provide load balancing support and can decide which clustered service is the "master", and the clustering tool(s) will be dependency services. For example, a clustering tool 302 can be defined in the service template 430 as a dependency. That is, the cluster 252 of services 250 can depend on the scheduler/clustering tool 302. Also, for example, if a service 250 depends on a database service it can depend on a cluster 252 of that service 250. In other example embodiments, the service 250 itself may have its own "election" process.

Figure 9:
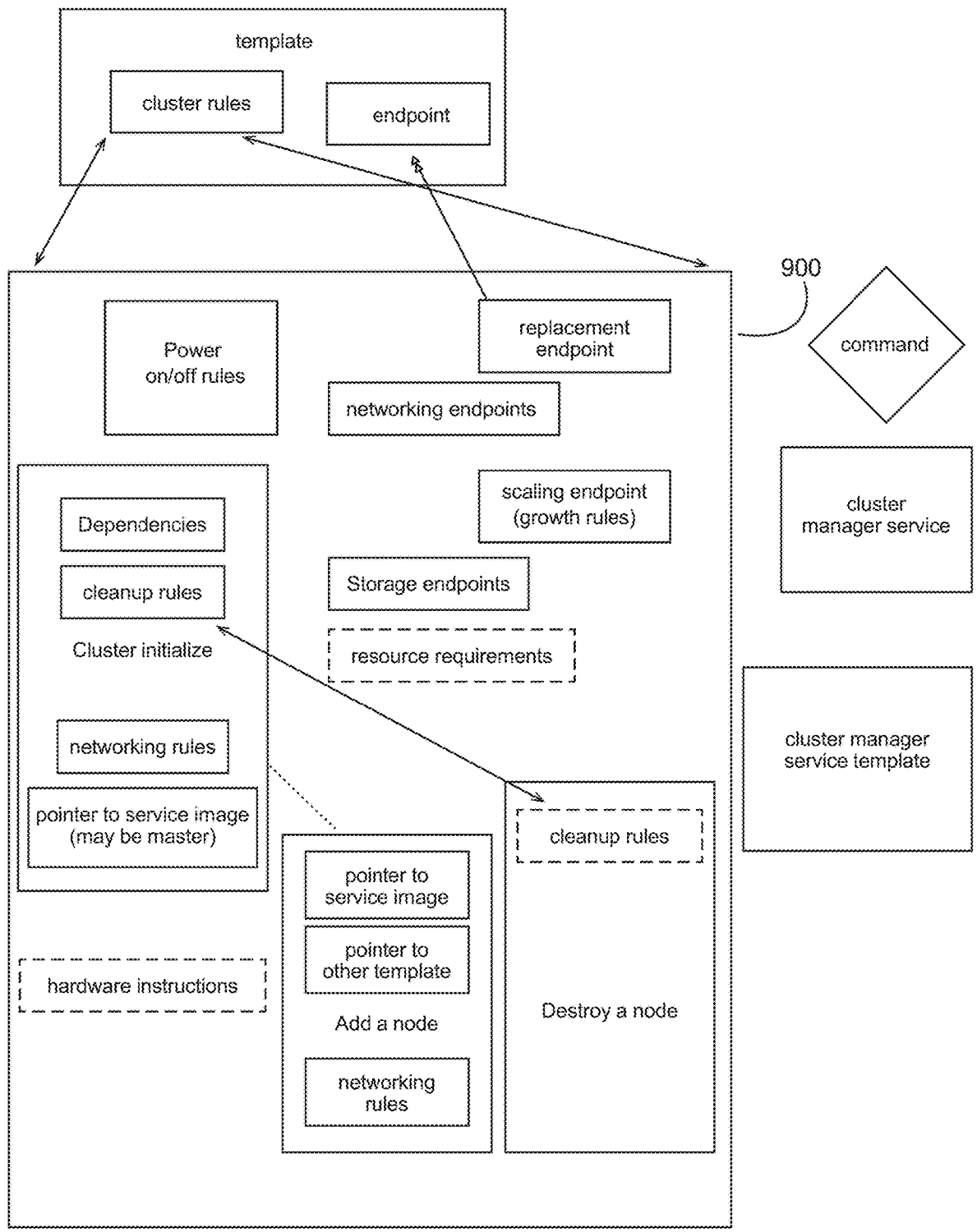
FIG. 9 shows an example set of clustering rules.

FIG. 9 illustrates an example set of clustering rules 900. These clustering rules 900 contain instructions allowing controller logic or resources/service instances to manage clusters. These rules may contain rules including but not limited to power on/off rules and cluster initialization rules. The cluster initialization rules allow the controller logic, cluster manager, and schedulers to initialize cluster resources and configure the necessary resources for a new cluster.

These instructions may contain hardware-specific instructions that can change the rules based on the supported hardware. They can be done as conditional logic inside the rules 900 or the rules 900 can call a set of "hardware rules" (where these hardware rules identify the hardware that is supported and what to do for each type of supported hardware). The hardware type can contain information on the base hardware and/or can contain requirements on addon cards including but not limited to network cards, infiniband cards, HBAs, disks, GPUs, ASICs, FPGAs, and/or any type of daughtercard. Optionally, there can be hardware change rules allowing hardware types to change; often times they are complex and would likely not be implemented except for simple changes such as removing/adding a GPU but they can be used for any change and can instruct the controller or any daemon that has remote power access to the compute resource having the hardware changed to reboot that resource.

Service template 430 may indicate that any services deployed from a template must be a cluster, and they may also indicate that a dependency service be deployed as a cluster as well as mandate hardware types for that clustered instance. Growth/shrink rules (e.g., add a node rules and destroy a node rules as shown by FIG. 9) in the clustering rules can call growth/shrink rules on dependency clusters by calling logic inside the dependency service's clustering rules. This likely will be for a storage dependency where more disks are needed and that storage provider is packaged in a service template used as a storage resource provider to the dependent cluster. Clustering rules can also dictate that a dependency service may only serve as the dependency for that specific cluster (example, storage, networking can be a pool only for that service if there are some software issues with that service being shared when in normal cases it is ok to share).

Figure 11:
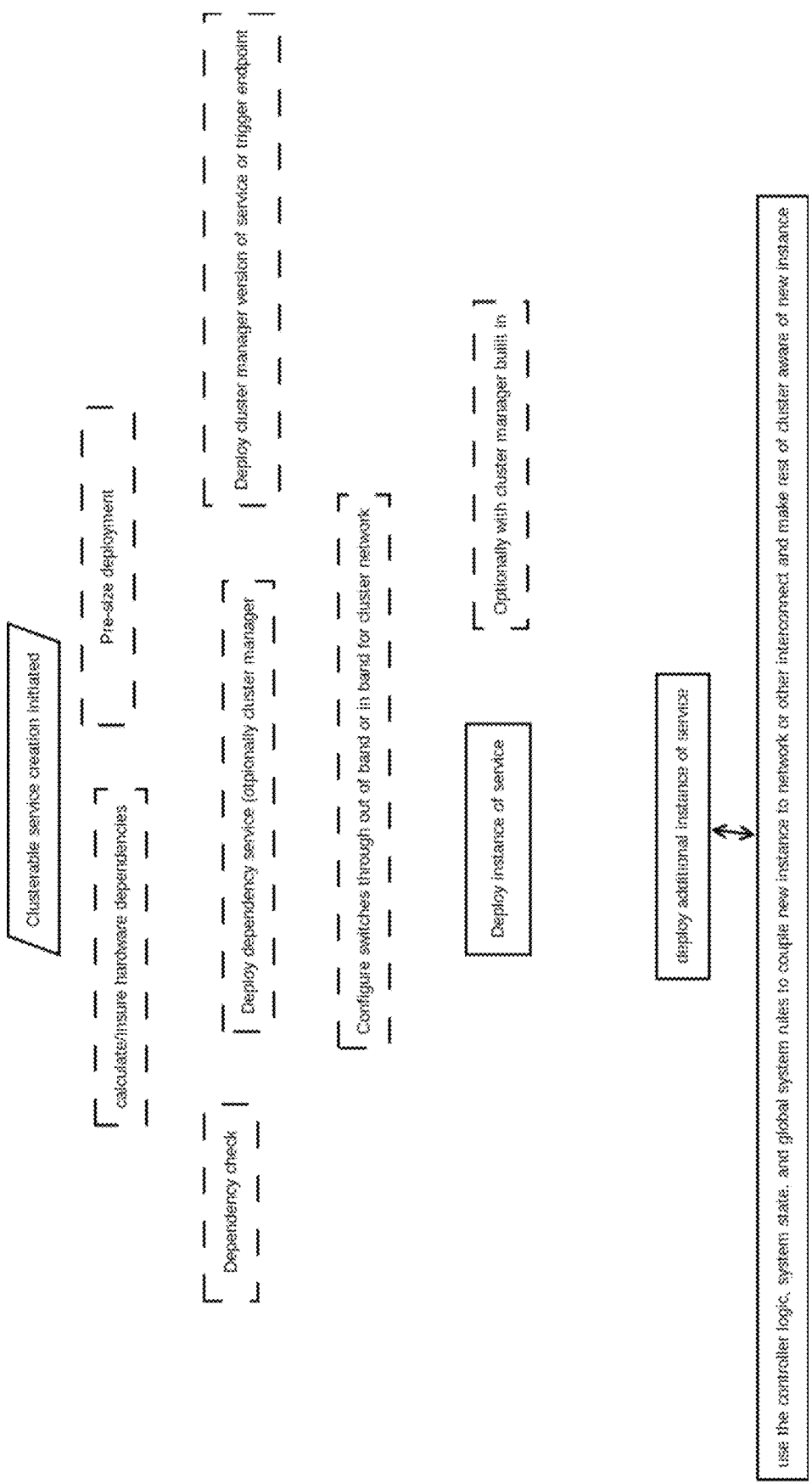
FIG. 11 shows an example where a cluster is deployed as a service.

Cluster initialization rules contain programs, logic, and/or instructions to initialize a cluster. There can be hardware instructions for each necessary piece of hardware, and the controller 200 can check any resource requirements. The cluster initialization rules can contain calls to endpoints on a dependency service. They can send configuration rules to a network switch, set up access to a storage array, reserve a data pool, and resolve dependencies needed for a cluster (for example, a single instance of a service may only need its own internal storage but for a cluster it may need shared storage). FIG. 11 shows an example set of operations that can be performed in connection with the initiation and deployment of a cluster by the system.

Growth rules allow resources to be added to the cluster. These rules will spawn, provision the new resource which can be the deployment of a new copy of the clusterable service. The rules can then update all the other resources/instances of the service, cluster manager(s), and/or specific instructions for the master instance.

Shrinking rules can invoke cleanup rules to remove the instance of a resource in a cluster from the other resources to prevent a dependency on a no longer existing resource. The cleanup rules can be coupled to the growth rules as those rules often are coupled A scaling endpoint or scale rules can suggest a user prompt or automatically change the configuration of a cluster at a certain size. As an example: it can be shown that sometimes network bandwidth can saturate a cluster with node-to-node communication, and shared storage can improve scaling after a certain amount of nodes; therefore this rule may mandate a dependency such as a shared filesystem storage dependency.

Clustering rules can replace an endpoint in a service if changes are needed for a cluster. The new endpoints might become hardware-specific. These endpoint changes often exist as making changes to a cluster differs from an individual service. Often in the case of but not limited to this case: a master node or a cluster manager or in any other case the replacement endpoint can make a call to a dependency service that could be the "cluster manager" or can be replaced as an endpoint that will then make the same command to every instance of the cluster.

Clustering rules 900 may also dictate that endpoints run on every resource allocated to the cluster. For example, if there are multiple nodes, the controller 200 can remote in to each node to run the required commands or can invoke the endpoints running on each instance/resource depending on the layout (for example, are the endpoints on the controller 200 and the controller remotes in and types commands? Or are api endpoints invoked on the machines running the service?)

Figure 13:
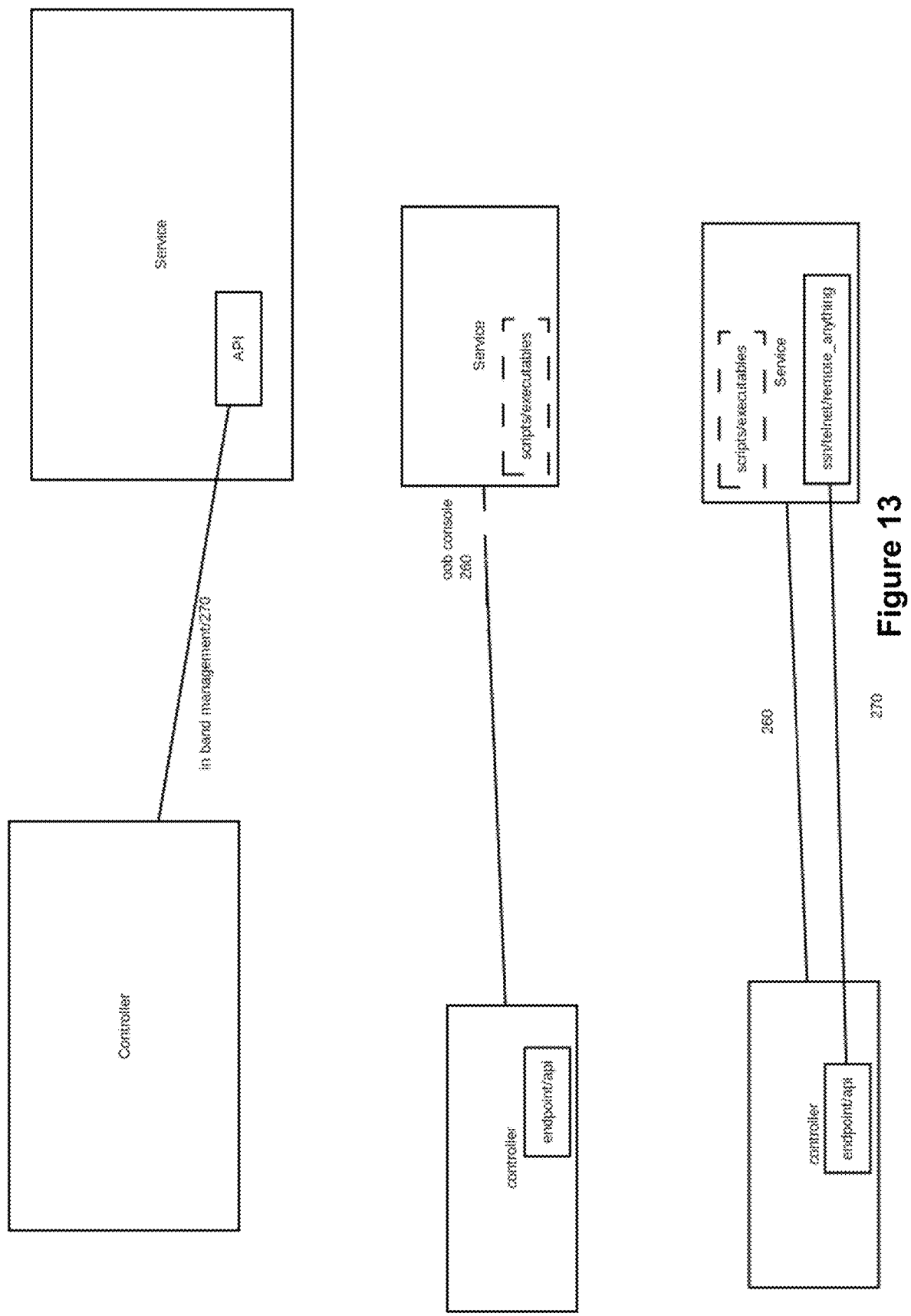
FIGS. 13 and 14 show examples of different ways to call endpoints.
Figure 14:
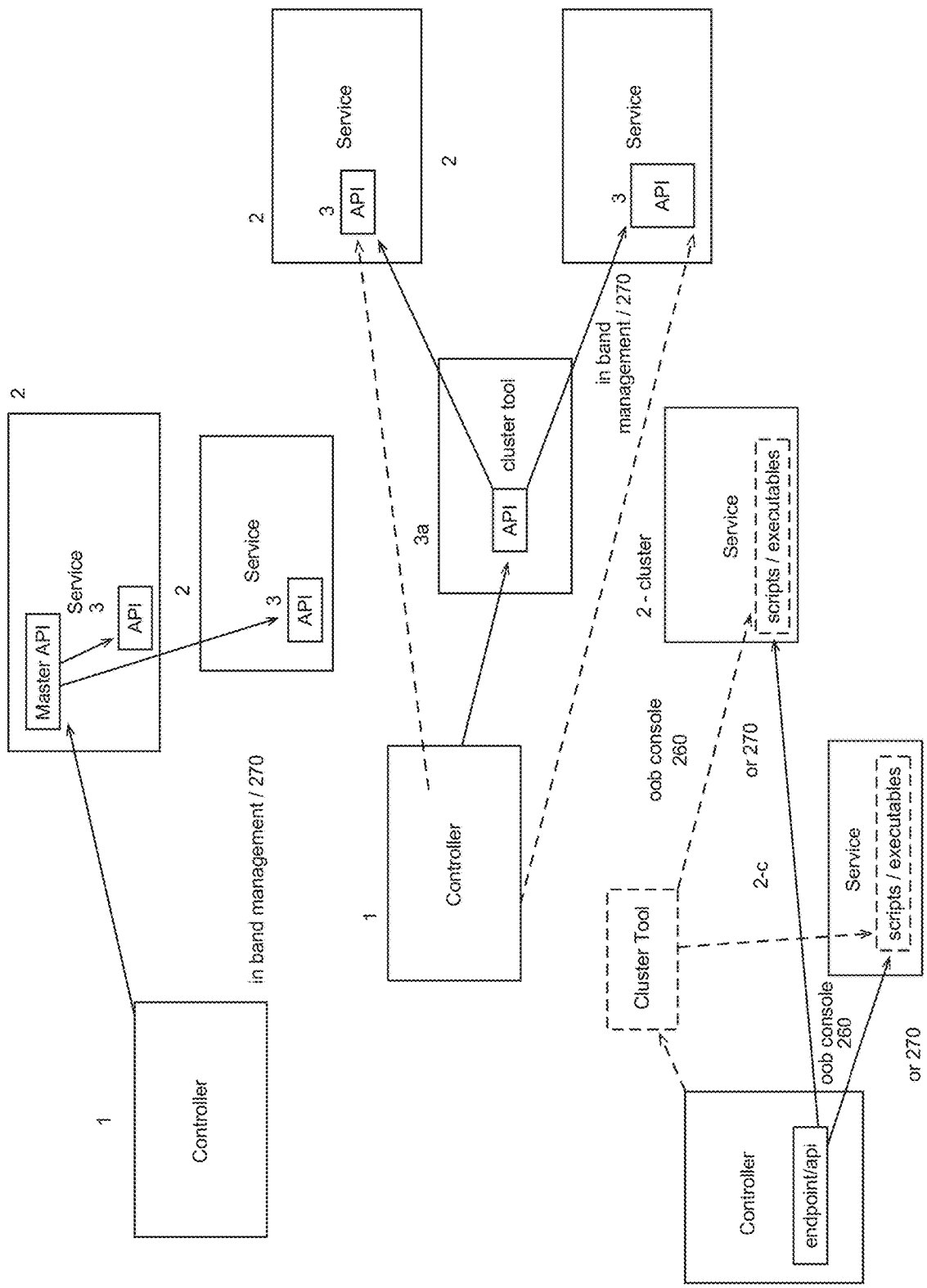

FIG. 13 shows examples of different ways to call endpoints. For example, the controller 200 can use in band management 270 to call a service via an API. As another example, the controller 200 can use an endpoint/api to call service (e.g., scripts/executables that are part of the service) via OOB 270 (e.g., an OOB console). As another example, the controller 200 can use an endpoint/api to call ssh, telnet, or other remotes on the service via in band management 270 while using OOB 260 otherwise. FIG. 14 show examples of different ways to call endpoints for clusters.

Figure 5:
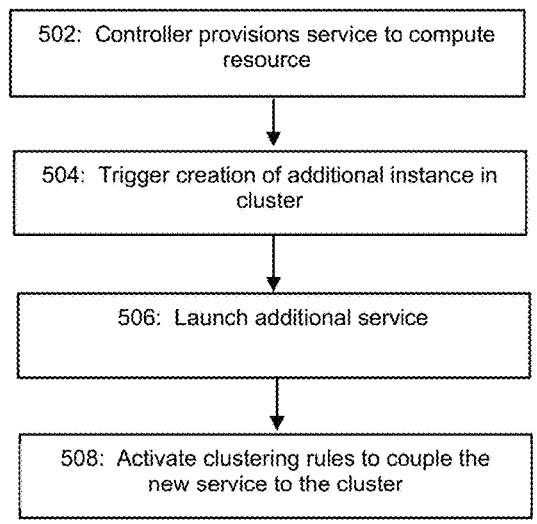
FIG. 5 shows an example process flow for adding a compute resource to a cluster.

FIG. 5 depicts an example process flow for initializing a new service instance into a cluster. At step 502, the controller 200 provisions a service 250 to a compute resource 300. At step 504, the controller 200 triggers the creation of the service 250 in a cluster 252. At step 504, the service 250 is launched. Then, at step 506, clustering rules are activated to couple the service 250 to the cluster 252

The system may also provision a clustered service in its own environment and, instead of a dependent/dependency service, it can be a dependent/dependency cluster (which can be in its own environment).

A service that is clusterable may include code that runs inside the service that has clustering support built into it. Then, when such a service is packaged as a service template 430, there can be instructions in the service template 430 on how to set the service up in a cluster so that the controller can automatically configure that service and make all of the instances of that service talk to each other properly, including setting up the networking and other infrastructure for the clustered deployment. Different scenarios can be either user-chosen or chosen by rules inside the clustering rules 900. For example, there can be some rules that are automatic or suggested to the user once there are a certain number of nodes, a resource usage, types of hardware available (storage, compute, and networking—such as Infiniband or Ethernet). The service template 430 that is to be used for deploying the clusterable service in a cluster can be specified by a user or a service specification file can mandate it. For example, the service template 430 (e.g., a part of the service template 430 that can be in a json format) can contain hardware options along with clustering options, and when the service's configuration rules are processed, they can differ based on the hardware being used. For example, there might be a different base image for a different hardware type. As another example, different networking may be used, or other changes, etc.

Figure 15:
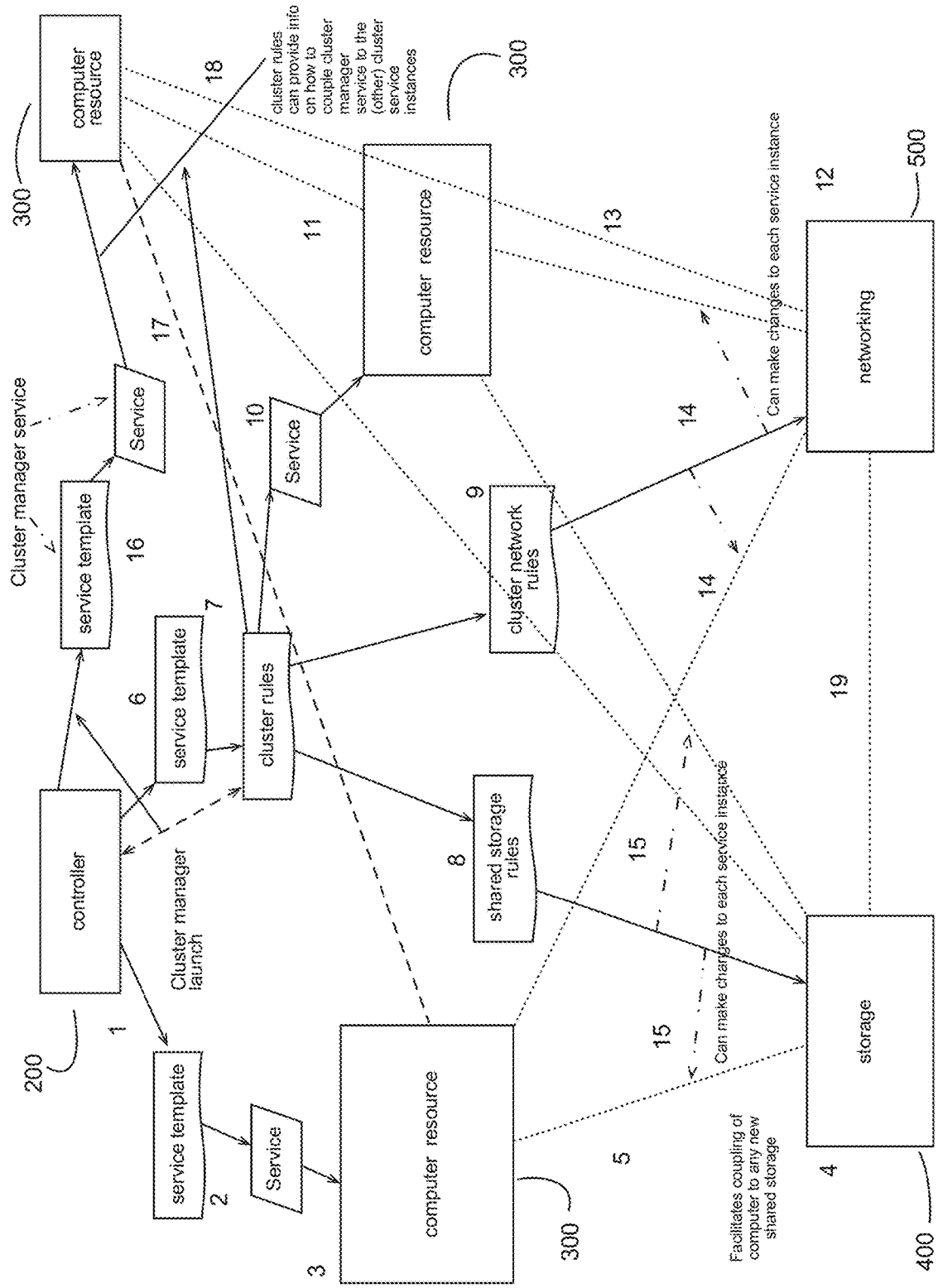
FIG. 15 illustrates a cluster deployed by a controller.

FIG. 15 illustrates a cluster deployed by a controller 200. This illustration shows either a service (see 1 in FIG. 15) deployed that is turned into a cluster or a service that is deployed as a cluster (cluster rules can also be processed if necessary; however with the first instance it is possible to not need them. The endpoints can exist on the resources/instances or on the controller, and the controller can use remote commands (as shown in FIG. 14). The first service is deployed from a service template (see 2 in FIG. 15), and the service image (see 3 in FIG. 15) is run on the resource (usually a compute resource). The compute resource 300 (see 5 in FIG. 15) can be physical, virtual, or a container; and the controller 200 can deploy the image on the resource using an iso and copying through out of band management 260 and copying files, flexboot, pxe boot, configured through in band management, APIs, and/or combinations thereof.

The cluster rules (see 7 in FIG. 15) can have shared storage rules (see 8 in FIG. 15) which can couple compute resources to a storage resource or a plurality and/or cluster of storage resources. The storage resources 400 could be deployed also as a clustered service as a dependency to the current cluster or as a different "resource type". 15 in FIG. 15 illustrates a coupling to the storage resources 400 which could include but are not limited to: authentication credentials/public key authentication to the storage resources, address of the storage resource, connection instructions, adding inifniband partitions and/or vlan tags to one or more of the compute resource's connection. More generally, any information needed to connect to the storage resource and the storage resource is properly configured (and networking resource changes necessary for the coupling are completed).

As clusters use multiple resource another resource is illustrated (see 11 in FIG. 15) that is deployed from a service template (see 6 in FIG. 15) and the service image (see 10 in FIG. 15); and configuration rules are derived from both service template and cluster rules is installed on the resource (see 7 and 10 in FIG. 15).

Cluster rules can check to see if the resource (see 11 in FIG. 15) is appropriate hardware and can make specific hardware related configuration (see the "hardware instructions" in FIG. 9).

Cluster rules can also contain network rules (see 9 in FIG. 15). These network rules can be packaged as an "additional resource type" or specifically as cluster network rules as clusters often have their own high speed network for quick interconnects. It can be a generic resource type or a dependency service deployed as a cluster but most implementations likely would have dedicated networking rules.

Network rules can couple resources to the networking resource 500 (see 12 in FIG. 15) and also can provision the networking resources. Network rules (see 9 in FIG. 15) can take an existing network and simply include a pointer to that network if there is no dedicated network. The network rules can enable ports that connect to the compute resources. The networking resources can also be the SAN but there can be a dedicated SAN or multiple dedicated networks. Networking rules may also include load balancing for example a dns round robin. There can be multiple networking resources and/or networks coupled to cluster resources. Cluster network rules can couple the appropriate networks directly to compute or other resources (see 14 in FIG. 15).

Both network and storage resources can also differ in hardware types, different storage protocols, network protocols, or network fabrics may be desired with different hardware types and these configuration differences can be derived from hardware rules (see the "hardware instructions" in FIG. 9).

A cluster can depend on a cluster manager or a cluster manager (see 18 in FIG. 15), and service template can be packaged inside the cluster rules. The cluster manager can be a master instance or can be a separate service. Another instance can be denoted a "master" if such a designation is required. The cluster manager can just in time configure resources, can have instructions on how to manage resources in the cluster and can monitor each service running in a cluster. Furthermore a cluster manager can act as a scheduler and schedule tasks on various instances in the cluster. Examples of cluster managers may include but are not limited to: schedulers (such as slurm), an instance of a service on a cluster that runs mpirun or any other message passing process launch tool. The controller logic can also function as a cluster manager if the cluster rules contain further logic that the controller can launch and can schedule those tasks on the controller.

Figure 16A:
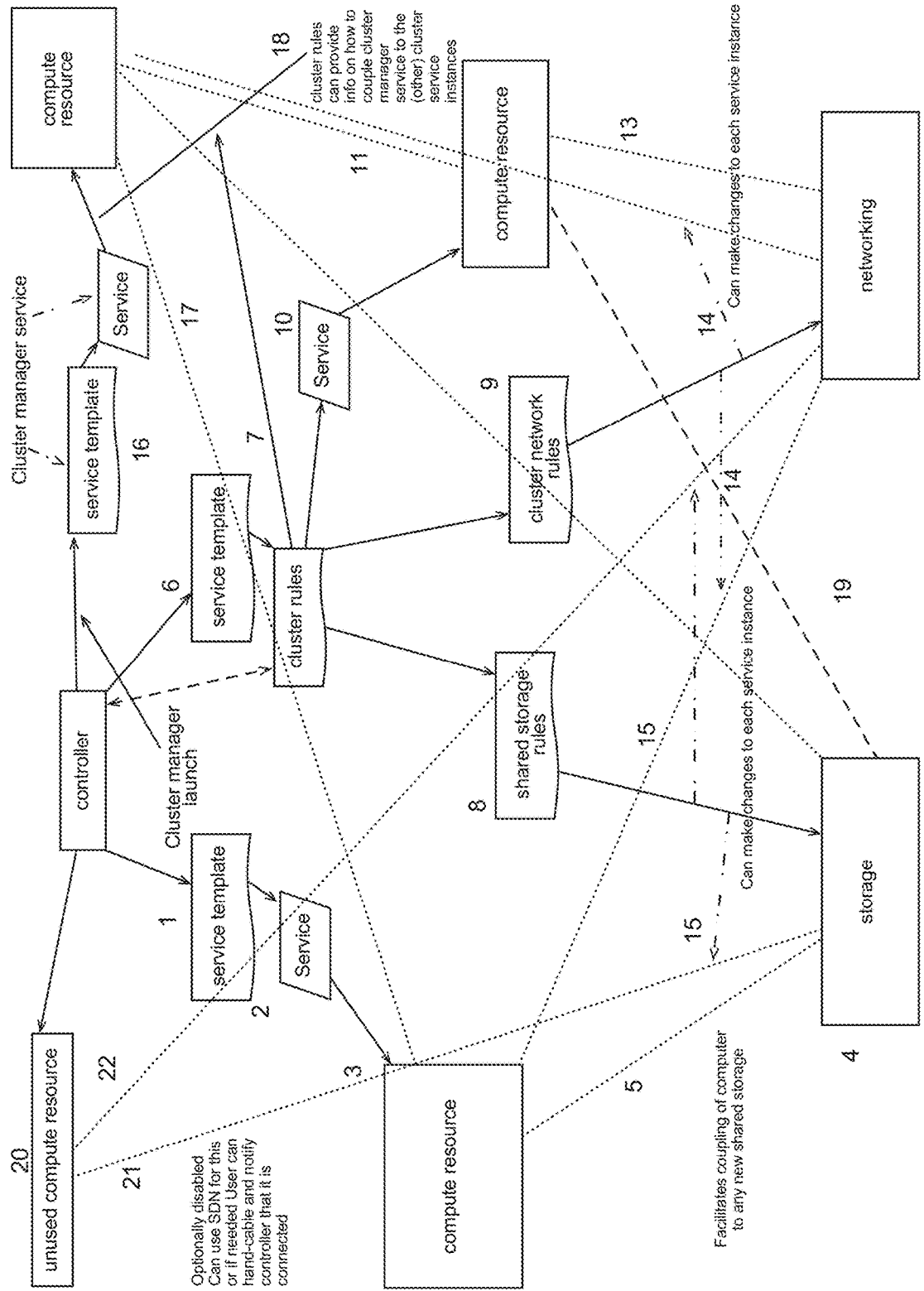
FIGS. 16A and 16B show an example where a computer resource is added to grow a cluster.

In FIG. 16A, an unused compute resource is available to grow the cluster (see 20 in FIG. 16A). This can be any type of resource, and this figure is analogous for adding a storage or networking resource. This resource can be originally physically coupled to storage and networking respectively (see 21 and 22 in FIG. 16A). The connections can be disabled with software defined networking; or the connections can be enabled and not used; and/or a UI can direct a user to plug in the new cables. Clustering rules will couple the unused resource to the cluster.

Figure 16B:
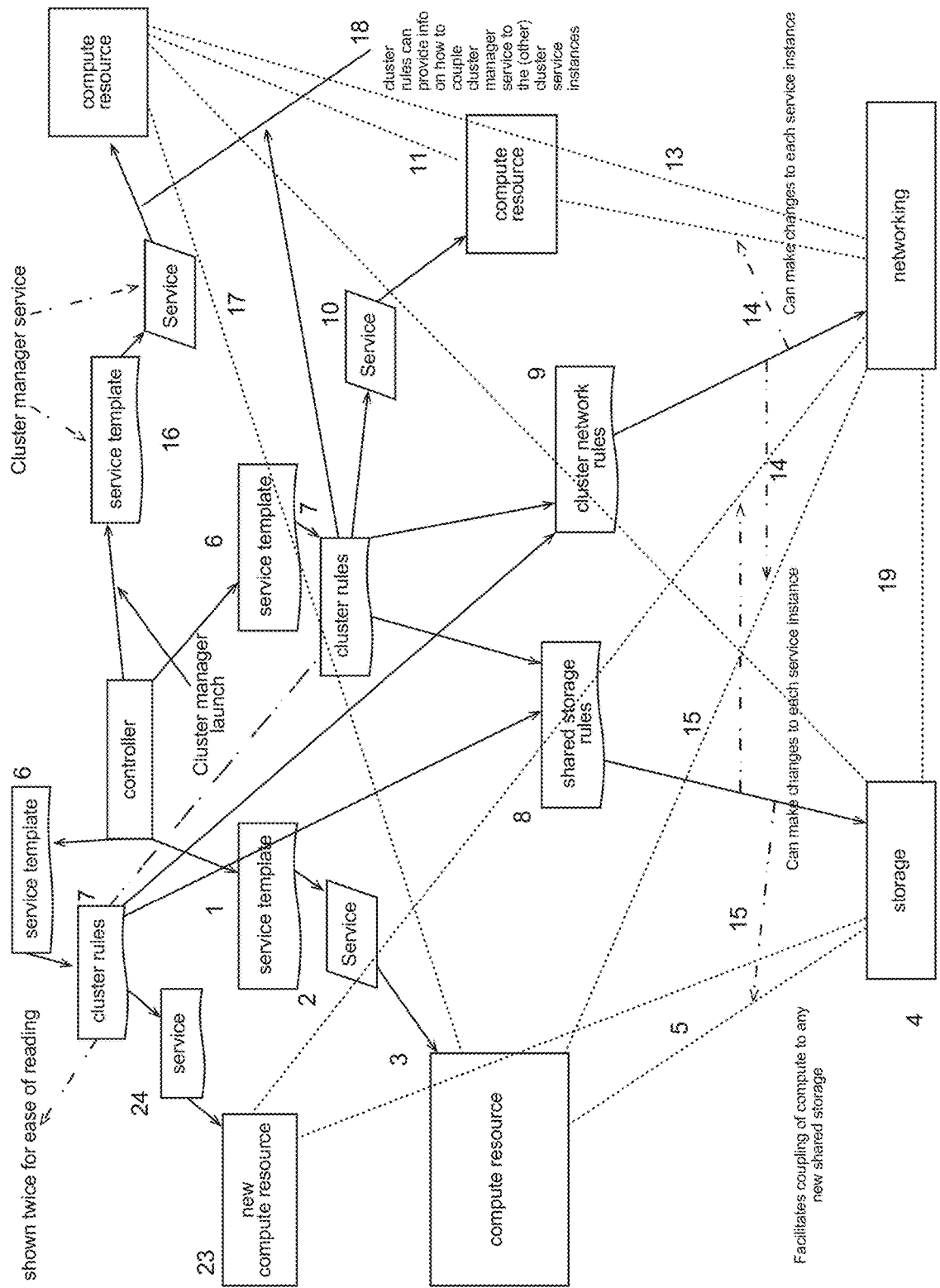

The cluster is adding a resource, and FIG. 16B shows a schematic view after the new resource has been added. The controller logic uses the service template (see 6 in FIG. 16B) along with the corresponding cluster rules (see 7 in FIG. 16B) to add the resource. The service image (see 24 in FIG. 16B) is configured so the new compute resource 23 will be part of the cluster. It is then coupled to all other clusters/dependencies/resources (i.e. compute and storage). All other resources can be updated to make use of this new resource (including but not limited to reference numbers 4, 12, 3, 11, 18 in FIG. 16B). If there is a cluster manager (see 16/18 in FIG. 16B), it can be updated with information on how to couple the new resource (see 23 in FIG. 16B) to the cluster.

Figure 17A:
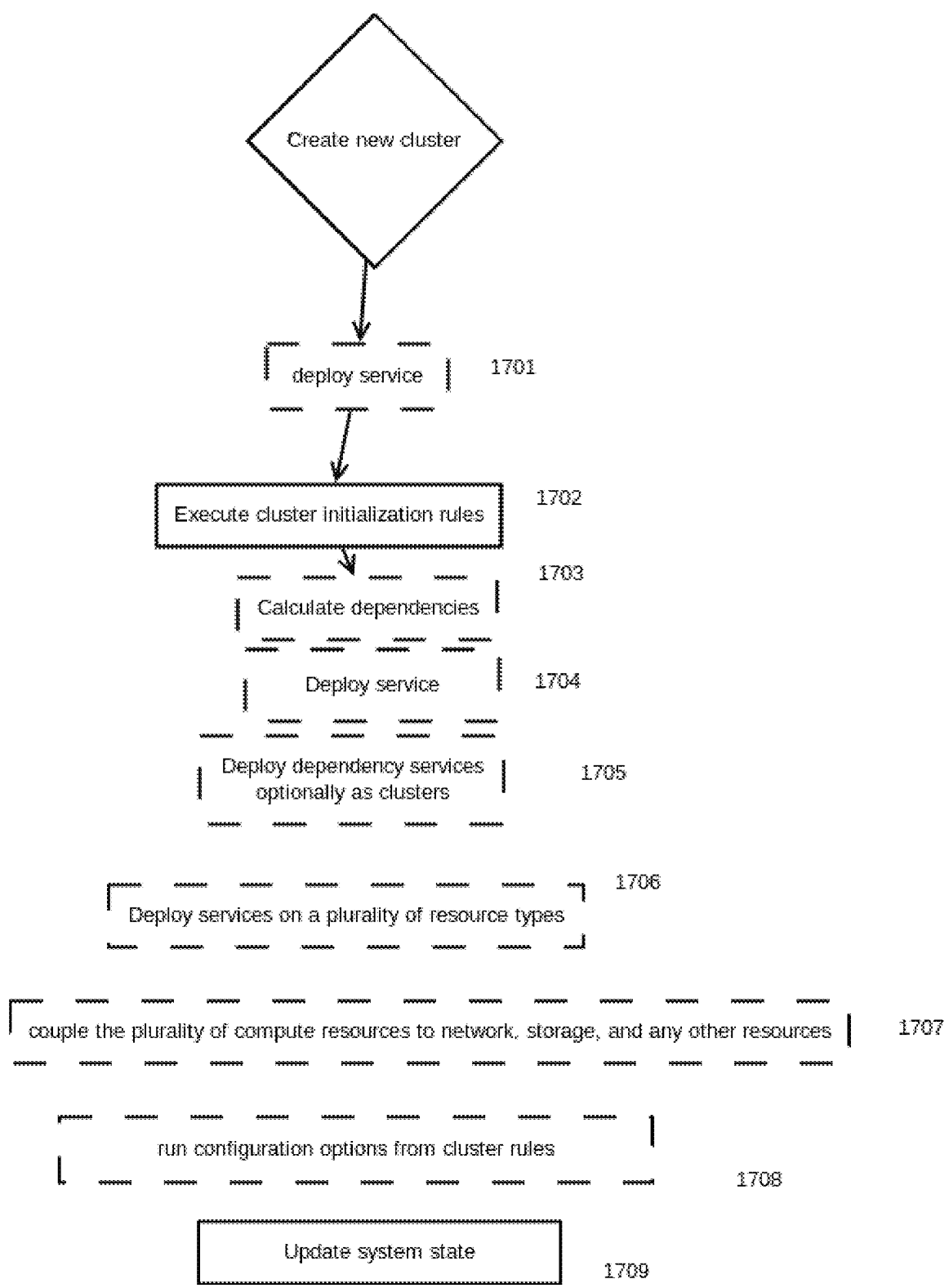
FIG. 17A illustrates an example process flow for the creation of a new cluster.

FIG. 17A illustrates an example process flow for the creation of a new cluster Clustering rules as shown in FIG. 9 can have initialization rules. A service can already be deployed 1701 or deployed at the initialization step. Initialization rules can have dependencies and/or pointers to other resource types or services to satisfy proper operation of the new cluster. For example in FIG. 16 label 3.

The cluster initialization rules can be executed from the controller or on existing resources or from a cluster manager service. The initialization rules contain instructions on how to build the cluster and couple pluralities of resources including but not limited to compute, networking, and storage 1702.

There can be dependency calculation that can be based on resource allocation 1703. Additional services or instances of the clustered service can be deployed 1704. There may be additional dependencies and if that is the case other services and/or clustered services can be deployed (for example an object storage cluster for shared storage functionality among cluster compute nodes).

Service templates with cluster rules can have the capability to generate multiple images by using the logic in the cluster rule and the data necessary inside the cluster rules along with hardware rules to deploy to a plurality of resource types 1706. In practice this is more easily accomplished using one resource type per cluster and including a dependency for the additional resource types (for example an object storage cluster service can be a dependency) 1705

The initialization instructions contain logic to couple each resource type together and enable all connections 1707.

Each instance of a service in a cluster can run configuration rules 1708 and the system state 1709 can be made aware of the state of each instance on the cluster. Using the system state instances of a service in a cluster may gather information from the controller if in band management 270 is available to gather information on other instances. As an alternative a cluster manager can push any new settings out to each service instance running on a resource.

Figure 17B:
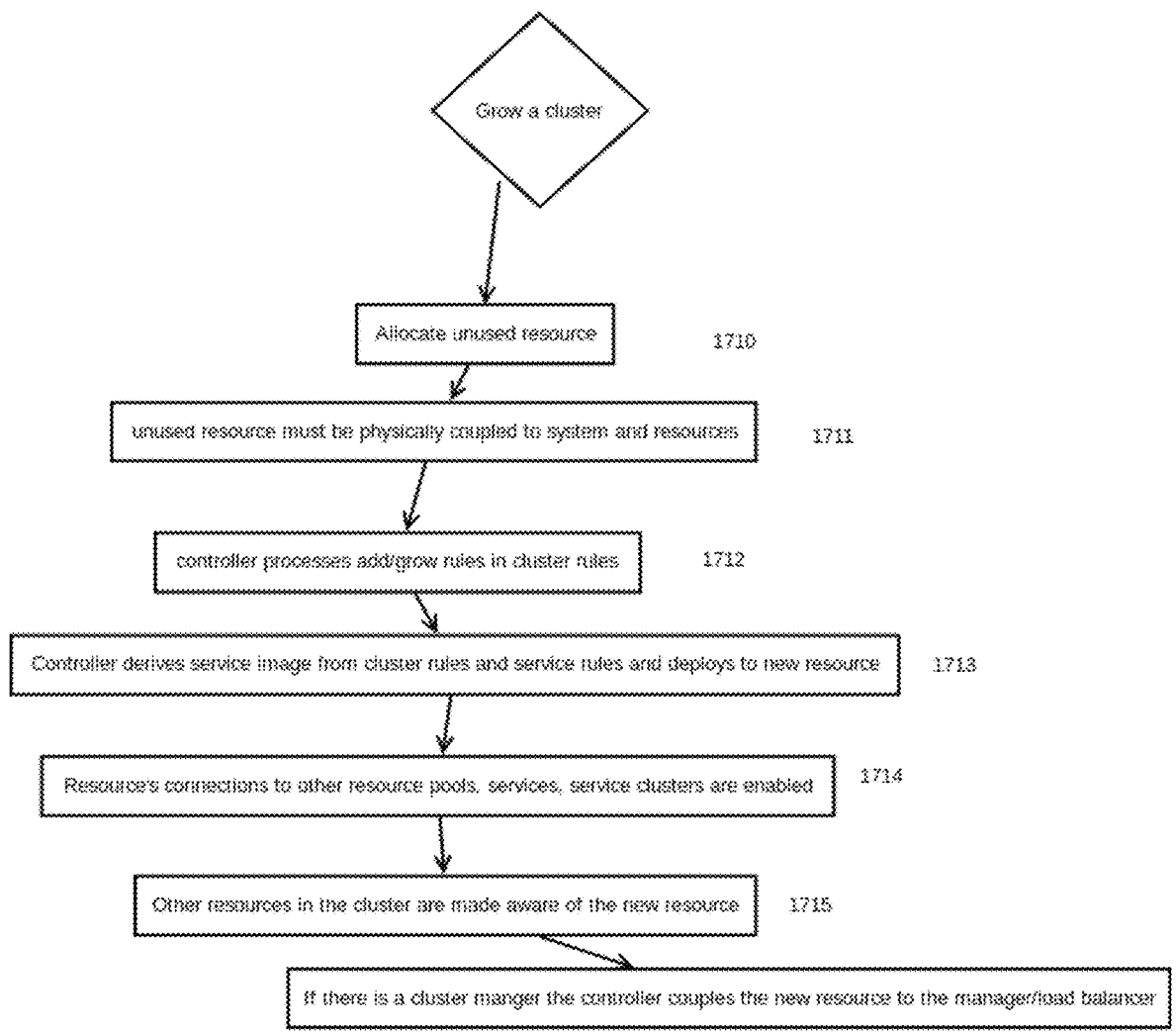
FIG. 17B illustrates an example process flow to grow a cluster or add a node/resource.

FIG. 17B illustrates an example process flow to grow a cluster or add a node/resource.

The unused resource must be allocated 1710 (example FIG. 16 part 20) the resource must be physically coupled to the system and to the cluster resources 1711 (example FIG. 16 part 21 and 22). The controller can then process add/grow rules in the cluster rules 1712 (FIG. 16 part 7). The controller then can derive a service image from the cluster rules, system state, and service template and/or rules and deploy to a new resource 1713. The resource's connections to any other resource pools, services, or service clusters can be enabled in 1714 if they were initially disabled.

Other resources are coupled to the new resource using the cluster rules and can update a cluster manager, the master node, and/or invoke logic on each resource in the cluster processing a loop to send the commands to every resource. 1715

If a load balancer is in use and/or a cluster manager the new resource can be added as a list of available resources along with connection logic to the resource.

An example of a clusterable service is Xyce. Xyce has support for OpenMPI built-in, and it knows how to use OpenMPI's cude support. When Xyce is being packaged, the service template will just need to know to set up Cuda-aware OpenMPI and whether Infiniband, Ethernet, or another network phabric is being used. Cuda is an nVidia GPU variant of C++, and Cuda-aware OpenMPI will send GPU-executable code to all the GPUs that are to execute on a gpu that can be coupled with other hardware (e.g., a server, cpu coupled with the service instance). Infiniband usage can be auto-configured to bypass the cpu on compute nodes hosting the services, for example using nVidia nvlink. Xyce itself has this support built-in, and the service template can be designed to include rules that in effect state if Xyce is being deployed on the proper hardware then its clustering features can be automatically turned on.

The controller 200 can provision through out of band and in band management (260/270) using PXE or IPMI and may use a custom bootloader and OOB 260 to a switch, configure a plurality of applications in a clustered environment, and couple the application, plurality of applications, instance or plurality of instances or combinations thereof. For reference, the controller 200 can also be labeled as ASSCM.

Figure 6:
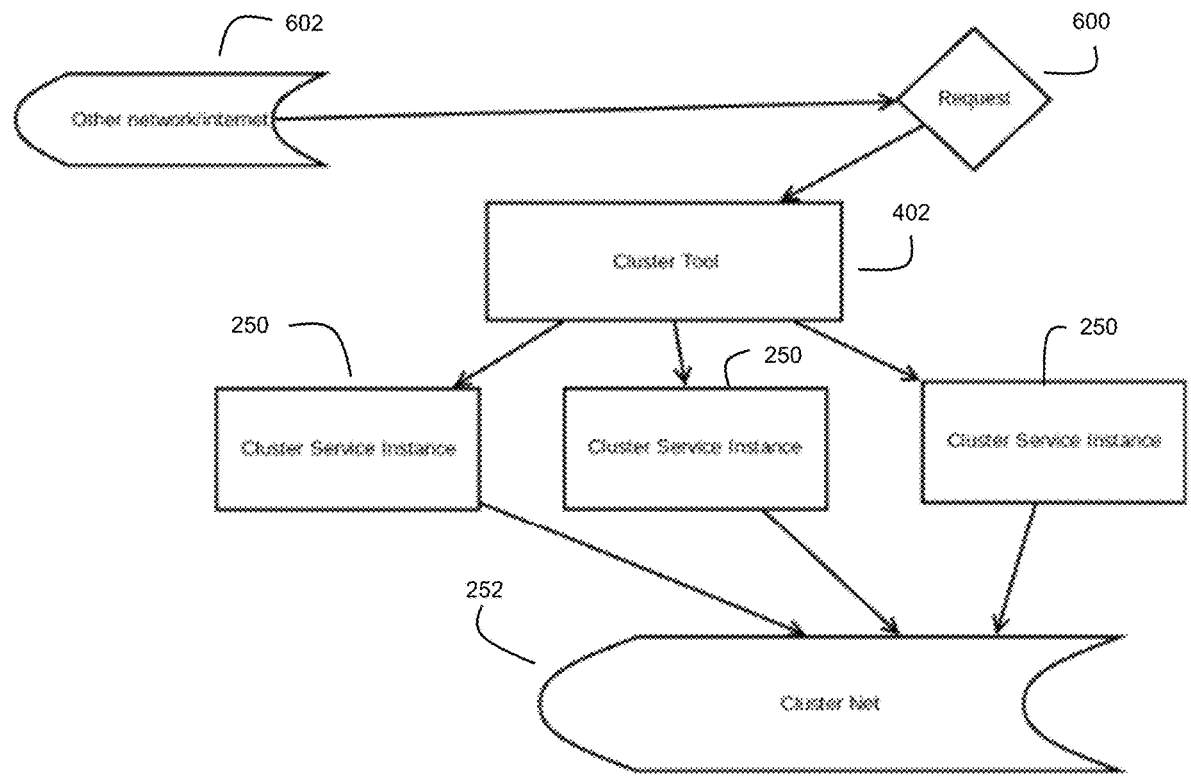
FIG. 6 shows an example of where a cluster tool manages a request for a cluster.

FIG. 6 shows an example where a request 600 can be sent to a cluster tool 402. This request can be a request from a user or an application for a data processing job that is to be performed by one or more services within a cluster 252. The cluster tool 402 can be configured as a dependency of a service that is optionally clusterable, and the cluster tool 402 can schedule the tasks and can use message passing tools such as openMPI. The clustering rules specified by the service template 430 for the relevant cluster 252 may dictate configurations for a clustering network used to couple the clustered services that may be implemented by the controller (e.g., see FIG. 9 discussed above). The clustering rules may be used to configure a networking resource 500 (e.g., a switch), optionally through out of band management 260.

Controller 200 can optionally couple an external network 602 and configure the processing of requests optionally on a cluster tool. This can result in a coupling of the cluster's network, cluster resources, cluster master instance, and/or cluster manager to the Internet and/or to another network in the system or outside the system.

Figure 7:
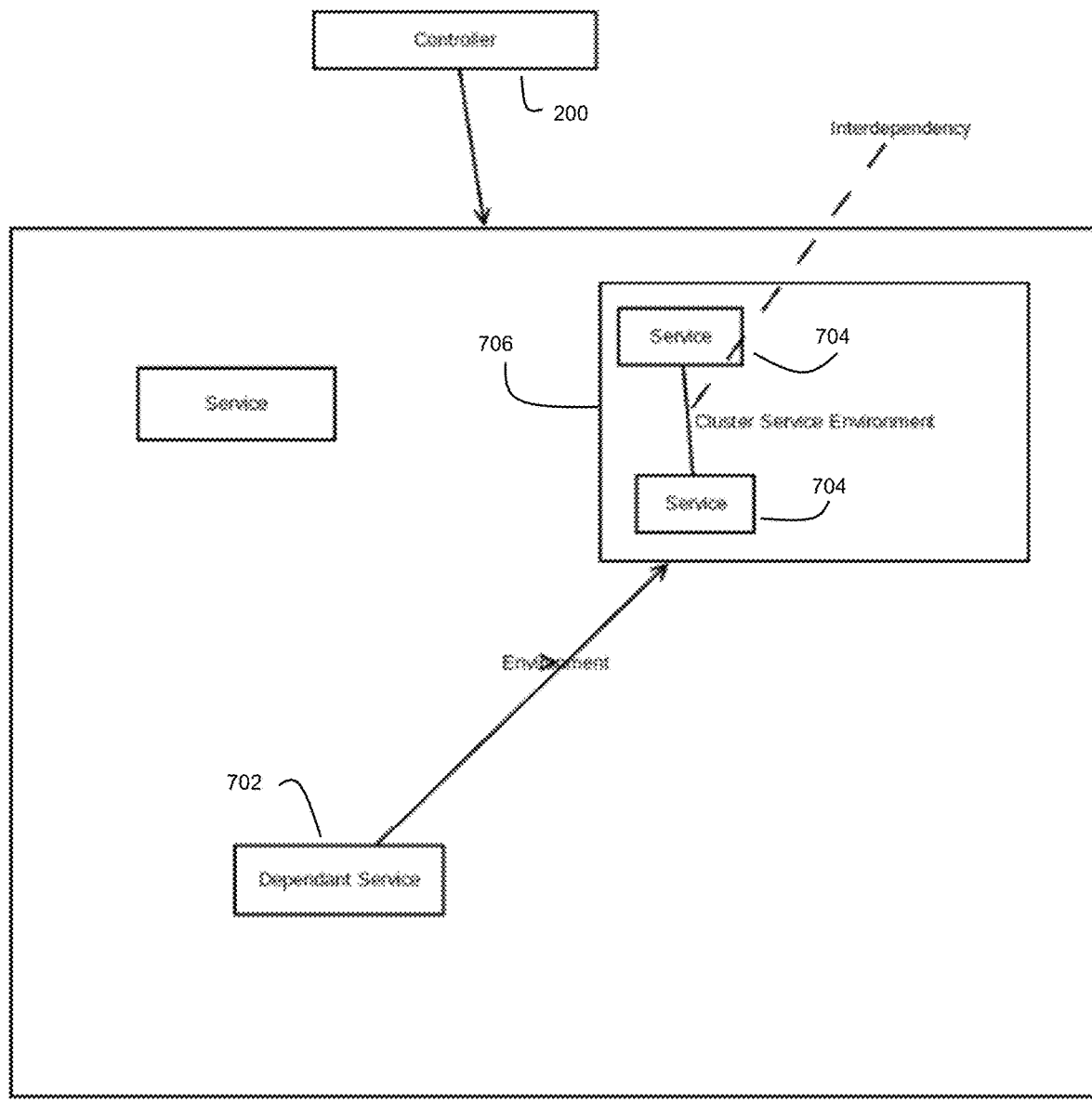
FIG. 7 shows an example of how the controller can manage/calculate dependencies for the cluster to satisfy dependencies.
Figure 10:
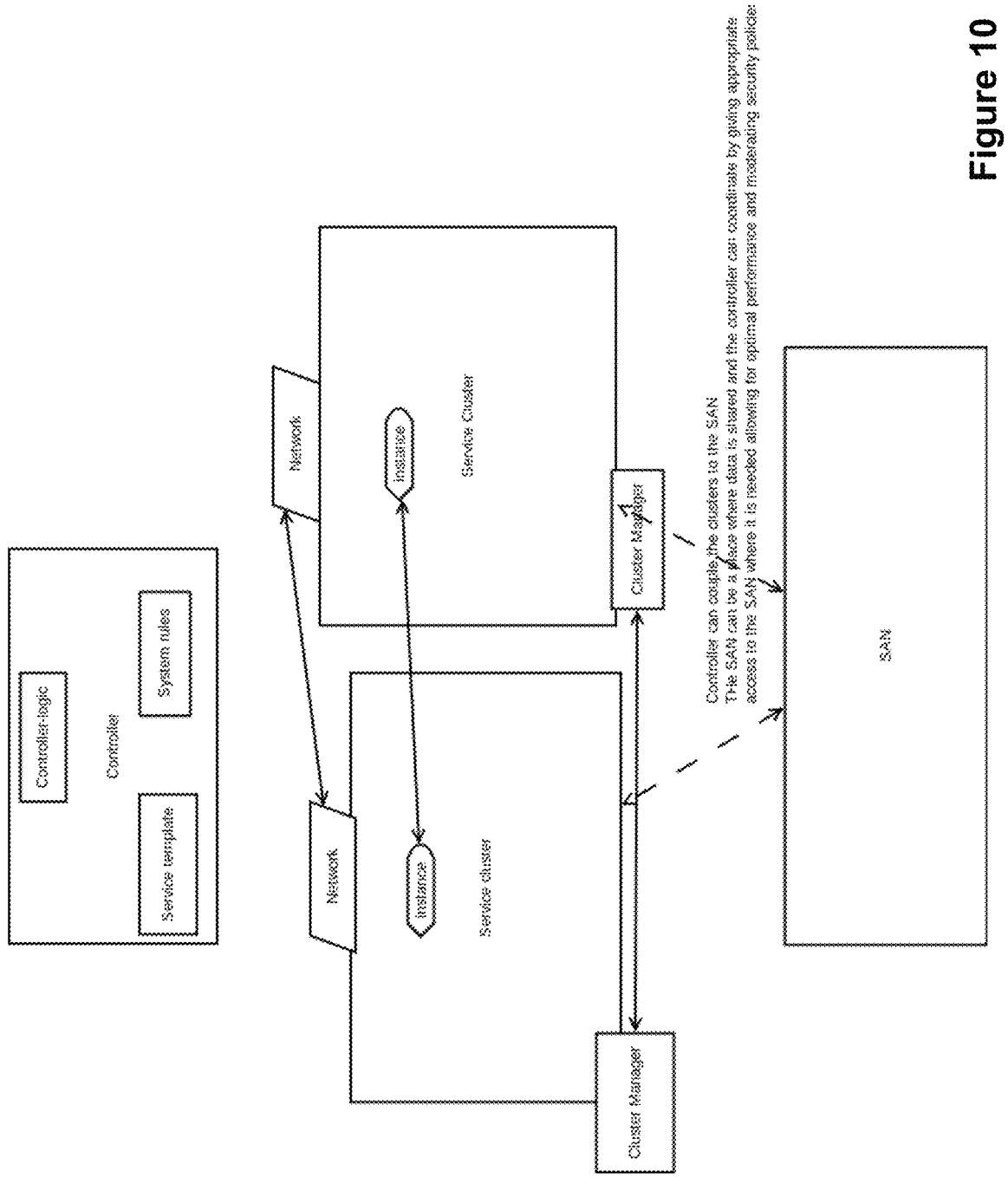
FIG. 10 shows an example where two clustered services that are interdependent and coupled with shared storage.

Controller 200's deployment system and dependency management can configure dependencies between services or dependencies between a clustered service and a dependent or dependency service FIG. 7 shows a service 702 that depends on another service 704, where service 704 is deployed as a cluster 706. The relevant cluster 706 comprises 2 instances of the service 704 (those services 704 can have an "interdependency" on each other. The interdependency is a simpler way to do a cluster where a service has an optional dependency on the other instances of that service that is currently running. Also, FIG. 10 shows an example where two clustered services are interdependent and coupled with a shared storage.

Figure 8:
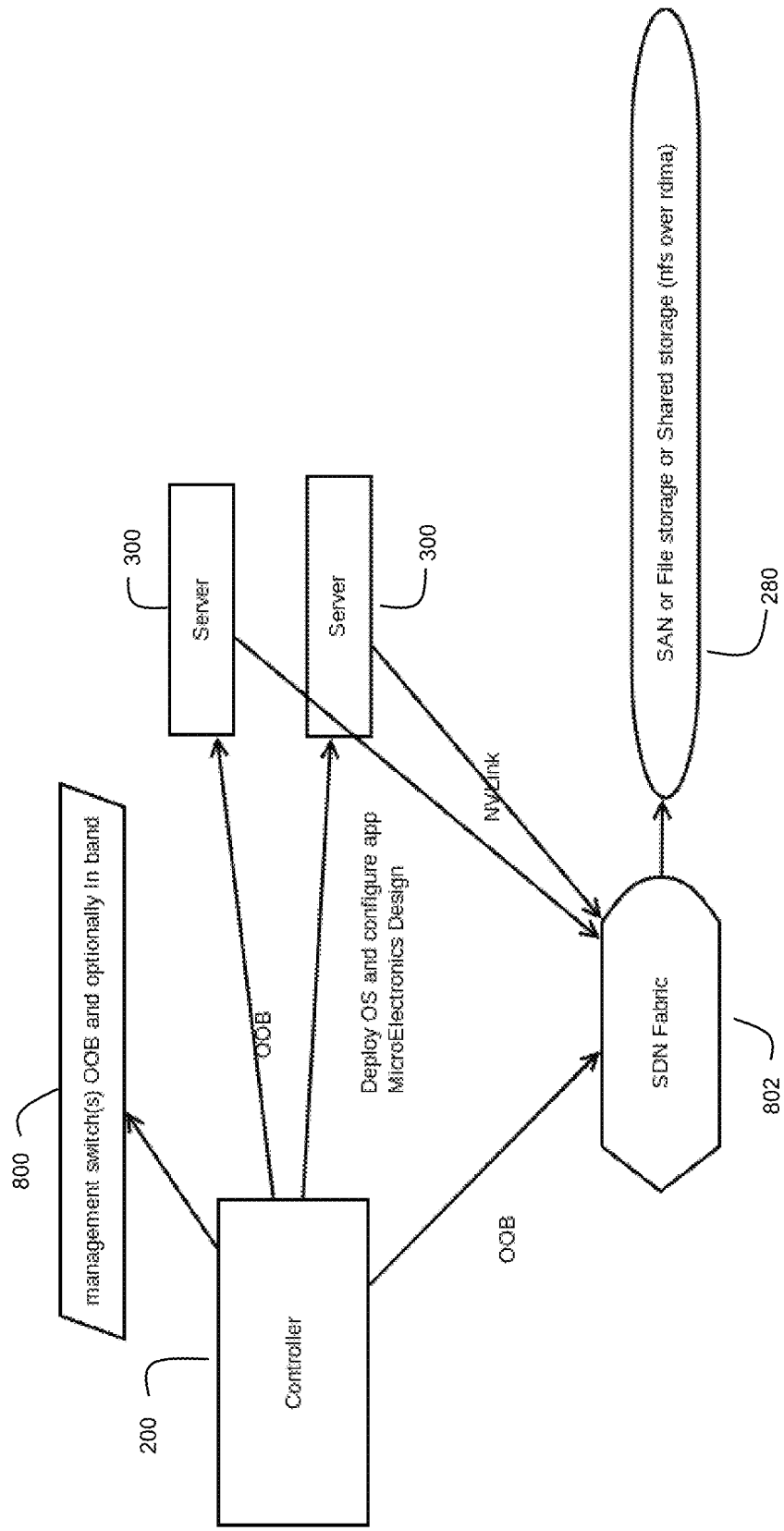
FIG. 8 show another example deployment of service instances in a cluster with a smart clusterable network and a storage area network (SAN).

FIG. 8 illustrates the controller 200 deploying applications—i.e. clusterable applications optionally deployed on baremetal (e.g., servers 300) optionally through tools including but not limited to OOB, IPMI, PXE, Redfish, Flexboot, custom bootloaders or combinations thereof. The nvlink can be used to bypass the CPU to use an Infiniband connection to copy from GPU memory to another GPU's memory. Accordingly, communication between nodes can be optimized for co-processors. There may also be a SAN 280 or storage resource 280 that can provide storage resources or act as a shared storage resource between instances of the clusterable applications that can be automatically configured on baremetal. The networking resources may also be configured out of band by the controller 200. Switch 800 in FIG. 8 (which may comprise multiple switches) can be a switch that connects to the compute instances (usually ethernet) and does in band and/or out of band management. (can be 2 switches). SDN fabric 802 can be another switch (e.g., a smart switch) that the controller 200 can configure so that switch 802 serves as a high speed switch for the cluster so the nodes 300 can talk together really fast.

Figure 12:
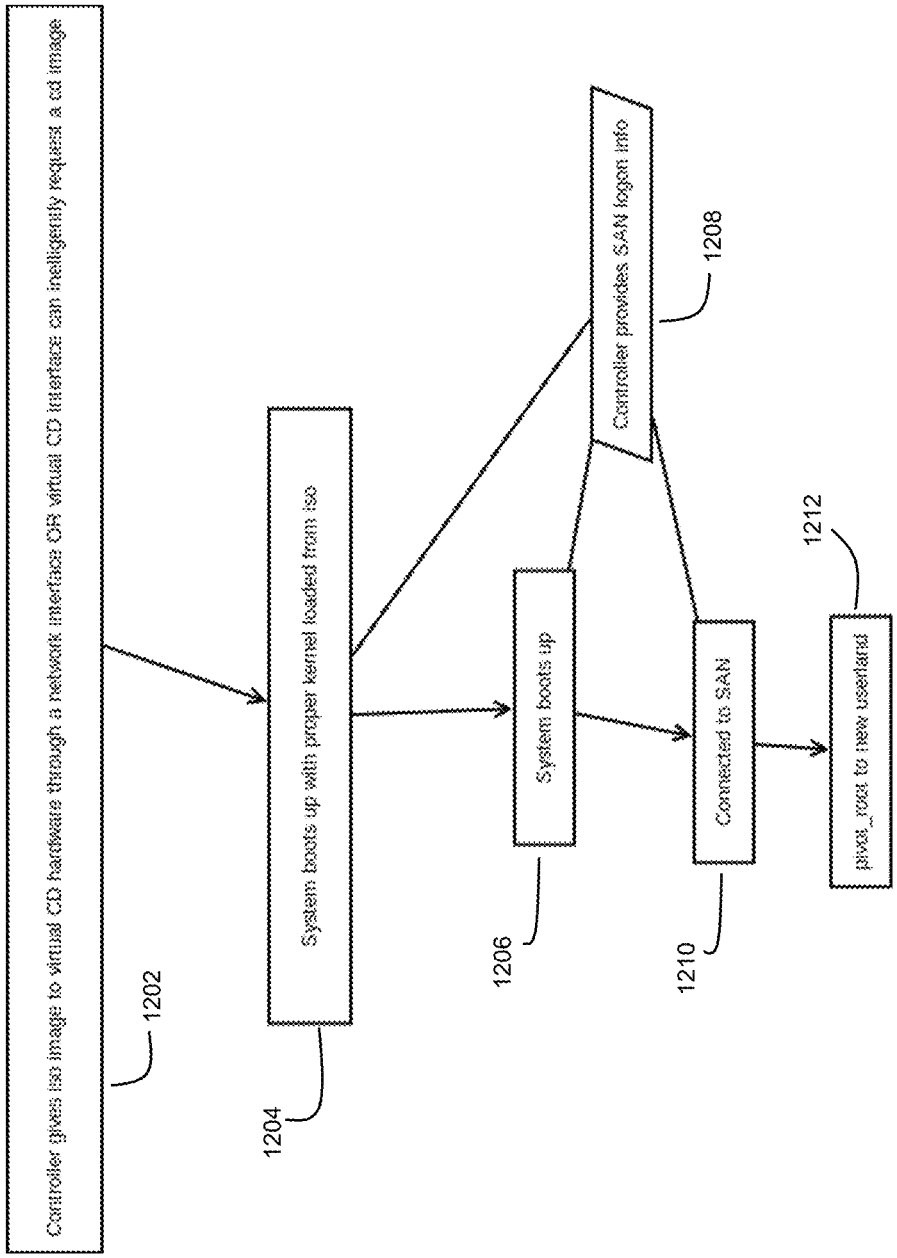
FIG. 12 shows an example process flow for system bootup.

As example embodiments, system 100 with automatic clustering will be able to automatically deploy clusterable apps to bare metal and configure the rest of the system making a turnkey deployment HPC system environments. As an example, the system boots an ISO, storage resources are connected, and pivot_root is called to move the root filesystem. FIG. 12 shows an example process flow for this. At step 1202, the controller 200 gives an iso image to virtual CD hardware through a network interface. Alternatively, the virtual CD interface can intelligently request a cd image. At step 1204, the system boots up with the proper kernel loaded from iso, and the system boots accordingly (step 1206). At step 1208, the controller 200 provides SAN log-on information, whereupon connection to the SAN is achieved (step 1210). At step 1212, there can be a pivot_root to a new userland.

As an example embodiment, system 100 includes an out-of-band controller environment that is designed to allow rapid implementation of network infrastructure and on-demand high performance applications and services on nearly any hardware. The controller 200 can provide a highly scalable, "clustering aware" automatic deployment systems that can provide VM and container management and/or baremetal auto-deployment that can reliably scale HPC applications from a desktop/workstation environment to massively parallel HPC environments with thousands of nodes. Through its awareness of clustered services, applications, and resources, the controller 200 is able to create, destroy, shrink, and grow clusters 252 in real time. An API for the controller 200 that can be included as part of the clustering rules 900 can include an abstraction layer that provides flexibility for adding additional capabilities such as GPU support, cluster security management, and ML interfaces.

A cluster management API for the controller 200 can include an API definition file that contains the name, description, argument types, and result type for each API endpoint. The clustering rules 900 can have endpoints for doing "cluster commands". There can be a SDK for these endpoints. These files can then be used to generate API endpoint mappings at runtime. This API generation method makes it relatively easy to develop extensions to the core API as new services and capabilities are added. The server-side implementation of the API endpoint can comprise a mapping of the API endpoint name to a routine that processes the arguments, performs work, and returns an object of the type specified in the API definition.

Figure 18A:
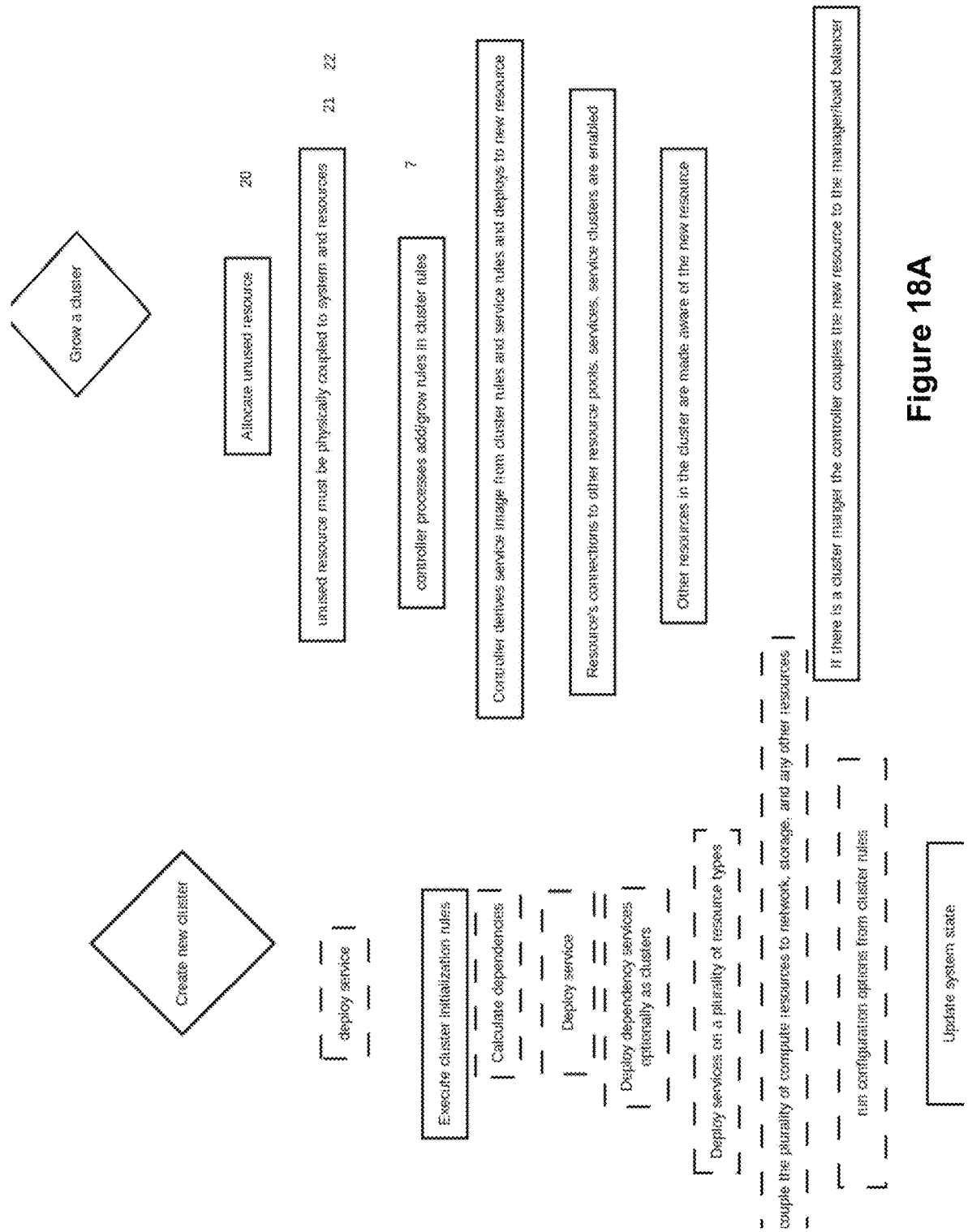
FIGS. 18A and 18B illustrate example process flows for various cluster operations.
Figure 18B:
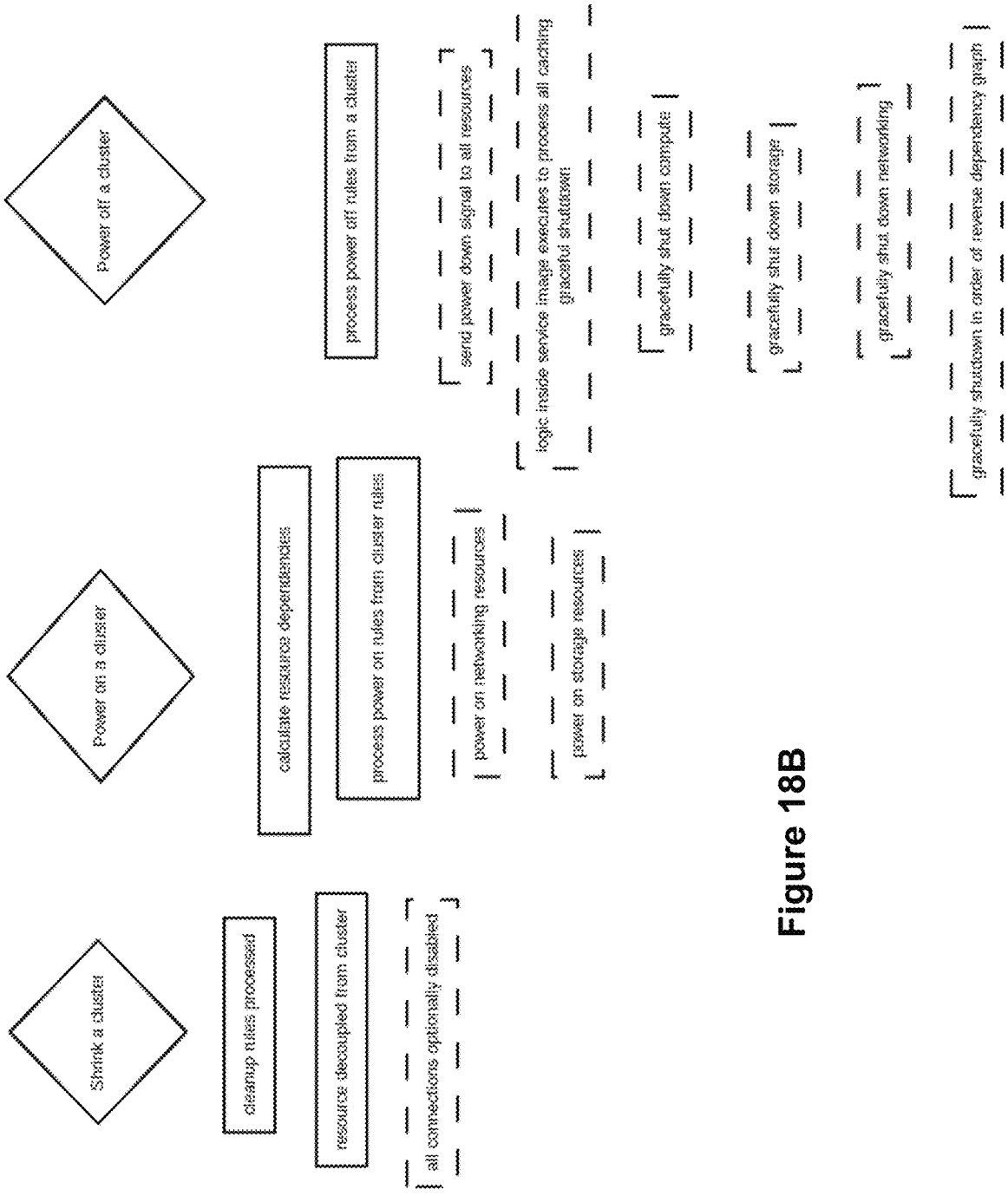

Examples of API endpoints that can be included for the API definition file include:
   Create a new cluster
   Destroy a cluster
   Grow a cluster
   Shrink a cluster
   Start and stop a cluster
   Get cluster health
   Upgrade a cluster FIGS. 18A and 18B show example process flows for these operations.

A cluster manager extension for controller 200 can incorporate an ability to orchestrate parallelization among multiple instances of applications and services as well as spin up multiple instances of single-user applications. The cluster manager can be responsible for tasks relating to management of clustered services and applications, even across interacting clusters, including (1) verifying, tracking, and scheduling changes to clusters and storing those changes in a persistent database, (2) issuing commands to other managers within the controller 200 to crease the necessary resources for clusters (such as virtual machines (VMs), storage objects, networks, etc.), and (3) automatically growing out and shrinking the clusters for clusters that support those operations.

In this regard, cluster manager operations can be triggered in response to API calls (such as user-issued API calls) against the Cluster API and in response to automation events generated internally. Commands are issued to a domain manager to create a new isolated environment for each cluster. These environments can have their own subdomain and subnet. These environments can also have a dedicated router/firewall (e.g., a router/firewall implemented as a Linux VM) for managing traffic in and out of the cluster. As an example, this domain will not be directly user manageable through the domain API; instead it can be managed by the cluster manager. Therefore, for such an example, all management operations on the domain can be forbidden unless issued by (or allowed by) the cluster manager.

Commands are also issued to the domain manager to create the services that reside within the cluster. This may be N copies of a specific service, and it may also include a dedicated scheduler (or control) service that hands out work to the nodes in the cluster. This approach allows a practitioner to support clustering software that requires a scheduler as well as software that is capable of electing its own "leader" to command the cluster.

Commands can also be issued to the router/firewall service in the cluster to allow access to the cluster from the domain which the cluster resides within.

Further still, commands can be issued to the service manager to deploy and manage each service in the cluster. For an example embodiment, services that are deployed as part of a cluster are not directly manageable through the service API. This prevents users from accidentally (or intentionally) modifying some of the services and leaving the cluster in an inconsistent state. Instead; services can be manageable as a group and changes can be applied to all nodes through the cluster manager, which ensures consistency across all cluster members.

The cluster manager extension can support defining dependencies between services via managed software deployments to allow treating a cluster as a single service for the purposes of service dependency resolution. For example, a job scheduler in a cluster may need access to a database service to store job results. Through dependency support via the cluster manager extension, clusters can depend on other clusters, which is a desirable characteristic for high-reliability environments.

A service package definition for the system can be updated to contain information about clustering requirements for HPC applications. The new service package definition extensions can be used by the cluster manager to determine how to properly deploy the cluster.

As another example embodiment, the system 100 can incorporate automation and management of OpenSM for configuring and securing Infiniband fabrics in HPC environments. Infiniband (IB) is a modern data fabric that enables high speed (up to 200 Gbps) connectivity between systems and is capable of delivering access to high performance block storage, as well as acting as a transport for OpenMPI.

To implement this, a local service OpenSM can be adapted into a smart controller that is aware of the status of the HPC system, individual nodes, fabrics, components, applications, and clusters of parallel operations. The smart controller can also configure interactions between these components for maximum security.

OpenSM can scan the IB fabric, initialize it, and sweep occasionally for changes. OpenSM can first be integrated with the controller 200 via out of band connection 260 and with a network daemon to create a network management daemon (NMD) for the system 100. The NMD will be capable of creating, destroying, optimizing, and otherwise managing IB configurations and automated requests generated by internal system events and services. The NMD can manage and configure IB hardware on the host, including route optimization algorithms (which may include minimum hop, DOR routing, and Torus-2QoS). However, instead of managing each VM or host in series, the NMD can negotiate with each host to optimally configure the IB fabric.

IB fabrics can be supported in the clustered system by extending a network API to support defining and configuring IB partitions and adding database tables for tracking IB and subnet manager states. Users will thus be able to create an IB partition using system 100 and have it persist in an internal database for the system 100. In this regard, a network API specification for system 100 can support the creation of a new network that represents an IB partition. This can be accomplished by adding support for a new kind of network—e.g., "ib-partition". This new ib-partition network type will only need to have a partition name supplied. After the network API specification has been updated to accept ib-partition as a new type of network, a new network plugin can also be employed. This plugin can be responsible for tracking the state and configuration of each IB partition that has been defined, storing fabric configurations in a persistent database, and defining the shape of the IB partition data structure that will be consumed by other components in the system 100.

When adding an ib-partition network to a VM, GUIDs can be generated for the IB interface that are persistent across VM launch and unique within the deployment. These GUIDs will be used by the NMD to set the GUIDs on the SR-IOV Virtual Functions before they are handed off to qemu to be passed into the VMs.

A new database table can be added to track ib-partition network to VM mappings and the GUI that will be used by that VM. This database table can use unique constraints and built-in database functions for generating UUIDs (which can take the form of 64-bit numeric IDs) that are unique across all mappings and usable as GUIDs for IB. Regardless of which compute host a VM is executed on, it will always have the same IB GUIDs until the device is removed from the VM.

To group related functionality together, the NMD can gain support for configuring ConnectX VPI cards that are present on the host to enable SR-IOV and set the GUIDs of each IB SR-IOV virtual function (VF) to values that the system 100 controls. This can help ensure that the fabric topology is consistent as GUIDs will be created when an ib-partition network is added to a VM. VMs can retain their IB GUID until the network is removed from the VM. To accomplish this, SR-IOV can be enabled in the Linux Kernel image that the system maintains as well as ensuring that Intel VT-x and VT-d or AMD Vi are enabled on the host. For this effort, the in-kernel IB drivers can be used rather than the out-of-tree IB drivers that are distributed with Mellanox OFED. The Linux VFIO drivers that will be utilized by qemu to hand off SR-IOV VFs to VMs can also be enabled. The NMD can utilize Linux SysFS to configure SR-IOV for the ConnectX cards, configuring the GUIDs for the VFs, and binding and unbinding the VFs from the Mellanox Driver when a VM needs to access the VF.

As part of this effort, new internal API extensions can be developed on system 100 to enable a Compute Daemon and the controller 200 to request the creation and configuration of SR-IOV VFs for access to the IB fabric. Four new API functions that can be employed for this include:

Request InfiniBand Virtual Function
Release InfiniBand Virtual Function
Get Max Number of Virtual Functions
Get Number of In-Use Virtual Functions The Request and Release APIs can require all necessary GUIDs are supplied to configure or tear down a VF, while the VF utilization APIs would be used to determine if the host can support another VF. If a new VF cannot be configured, then the Request API call can report an error. On success, the Request endpoint can return the PCI Bus-Device-Function (BDF) tuple that maps to the Virtual Function so the requestor can make use of the new VF.

Once the system 100 is capable of managing SR-IOV VFs for IB, there is a need for managing OpenSM through the controller 200. This capability is needed because the controller 200 can run multiple instances of OpenSM within their own Linux Containers to provide redundancy and failover support in the event of an OpenSM crash. Each of these Containers will have its own IB VF that the OpenSM instance can use to configure the fabric, and the controller 200 can be responsible for generating and storing the GUIDs for these interfaces as they must be consistent to ensure fabric stability. The controller 200 also be responsible for generating the necessary OpenSM config files and handing them off to the Containers via a read-only bind mount from the host into the Container file system. A separate read/write bind mount can be used to share a per-instance log directory with each container.

This work can be implemented as a "Worker Plugin" which is used by a light-weight process management layer that can be built into the controller 200. Worker Plugins define a process or set of processes that are expected to be running on the same host as the controller 200. This is currently utilized to manage local DHCP and HTTP servers that are used as part of infrastructure orchestration. This new Worker Plugin can launch a multiple OpenSM management containers using either and existing container runtime (eg, runc, LXC, or rkt), or by manually creating the Container by managing Linux Namespaces and Control Groups (cgroups). The bulk of the work for this task is in defining the behavior of the container, while generating the OpenSM configuration files is rather straightforward as the full specification is available in Mellanox's OFED documentation. Launching the OpenSM management container can be broken down into 8 steps, repeating steps 2 through 8 for each replica being deployed:

1. Generate the common OpenSM Configuration files. These will contain information about partitions membership, routing configurations, and QoS.
2. Communicate with the NMD to create and configure an IB SR-IOV VF.
3. Generate per-instance files:
   a. Log storage directory for storing OpenSM logs to be accessed by the Controller.
   b. Instance-specific configuration specifying OpenSM Priority for failover support.
4. Use the Container runtime to create a new container that contains OpenSM and the other OFED components and system packages necessary for functioning properly.
5. Bind-mount the OpenSM Configuration files as read-only into the Container.

6. Bind-mount the log directory into the Container as read-write.
7. Make the IB VF accessible from within the Container.
8. Launch OpenSM inside the Container.

The base container image can be based on Alpine Linux, the Gentoo Stage 3 image, or some other similarly small and trimmed down Linux distribution. In the event that OpenSM crashes and the Container terminates, then it can be re-launched or destroyed and re-created while one of the replicas takes over management of the fabric.

The OpenSM configuration can be generated based on the number of OpenSM replicas defined, and the IB partition membership that's defined by the "ib-partition" network membership of VMs, which are implemented as a Network Device attached to the VM. The controller 200 can dictate the priority of each OpenSM instance in the per-instance configuration that's generated, but a requirement will be at least running instances with priority 1 and 2.

Qemu supports PCIe Passthrough by means of the Linux VFIO driver, and specific command line arguments when launching qemu. To support this functionality, the Compute Daemon can issue an IB SR-IOV VF Request to the NMD on the same host as part of starting a new VM when that VM has an "ib-partition" Network Device. If the request fails, then the VM cannot be launched, otherwise VM startup moves forward as normal. The next step is to generate the necessary arguments to enable passing the VF into the VM.

The Compute Daemon generates qemu command line arguments by mapping the list of attached Devices to a set of equivalent arguments. Adding a new mapping can comprise inspecting the type of the Device (in this case, a Network Device that's attached to an "ib-partition" Network), and then taking the configuration associated with that Device and building out the command line arguments. For PCI Passthrough, this means using the "-device vfio-pci,host=$bdf" arguments to inform qemu of which VF needs to be passed through into the VM.

While the invention has been described above in relation to its example embodiments, various modifications may be made thereto that still fall within the invention's scope. Such modifications to the invention will be recognizable upon review of the teachings herein

What is claimed is:

1. A computer system for automating deployment of clusters of clusterable services, the system comprising:
   a controller;
   a plurality of resources;
   a service deployed on at least one of the resources, wherein the service is a clusterable service;
   a service template for the service, wherein the service template is used to deploy the service, and wherein a plurality of clustering rules are associated with the service template; and
   an API endpoint associated with the service template;
   wherein the controller is configured to perform a plurality of operations that automatically scale up the service to a cluster of services based on the service template, wherein the operations include (1) a read of the clustering rules, (2) deployment of a plurality of instances of the service on a plurality of the resources based on the read clustering rules, wherein the service instances include interdependent service instances, (3) connection of the service instances as the cluster based on the read clustering rules, and (4) configuration of a scheduler for management of the cluster based on the read clustering rules, wherein the management of the cluster by the scheduler includes scheduling of tasks for service instances in the cluster; and
   wherein the clustering rules (1) identify a replacement API endpoint and (2) define a condition under which the replacement API endpoint is invoked.

2. The system of claim 1 wherein the templates are included in a library of templates, and wherein the controller is configured to select the service template from the library.

3. The system of claim 1 wherein the management of the cluster by the scheduler includes load balancing of the service instances.

4. The system of claim 1 wherein the clustering rules include cluster initialization rules, wherein the cluster initialization rules identify dependencies for the cluster.

5. The system of claim 4 wherein the resources include shared resources, and wherein the cluster initialization rules comprise instructions to couple a plurality of the shared resources.

6. The system of claim 4 wherein cluster initialization rules comprise logic to couple a plurality of resource types together and enable connections between the coupled resource types.

7. The system of claim 4 further comprising a network switch and a storage array, and wherein the controller is configured to use the cluster initialization rules to configure the network switch, set up access to the storage array for the cluster, reserve a data pool for the cluster, and resolve dependencies for the cluster.

8. The system of claim 1 wherein the clustering rules include different rules for deploying the cluster based on a plurality of different hardware types for the resources on which the cluster is to be deployed.

9. The system of claim 8 wherein the hardware types include GPUs.

10. The system of claim 1 wherein the clustering rules include rules for growing the cluster.

11. The system of claim 10 wherein the cluster growing rules include a pointer to a service image for the cluster.

12. The system of claim 10 wherein the cluster growing rules include networking rules for the cluster.

13. The system of claim 1 wherein the clustering rules include rules for shrinking the cluster.

14. The system of claim 1 wherein the clustering rules include rules that identify resource requirements for the cluster.

15. The system of claim 1 wherein the clustering rules include rules for powering on and powering off the cluster.

16. The system of claim 1 wherein the scheduler comprises a cluster manager to be deployed by the controller, wherein the cluster manager is configured to decide which of the service instances is a master for the cluster.

17. The system of claim 1 wherein the controller configures the cluster via an out of band management connection.

18. The system of claim 1 wherein the resources on which the service instances are deployed comprise a plurality of compute resources connected to each other via a networking resource.

19. The system of claim 1 wherein the controller employs a pivot root process based on the service template, wherein the pivot root process enables booting of the cluster off a storage area network (SAN) with no bios dependencies.

20. The system of claim 1 wherein the clustering rules include scale rules that define the condition according to a predetermined size for the cluster so that the API endpoint is automatically replaced with the replacement API endpoint if the cluster reaches the predetermined size.

21. The system of claim 20 wherein the predetermined size comprises a number of nodes deployed to the cluster.

22. The system of claim 1 wherein the clustering rules include dependency rules that define interdependencies of the service instances and one or more resources of the computer system other than the resource on which the service instances are deployed.

23. The system of claim 1 wherein the clustering rules include cluster network rules that are configured to manage interconnections between the service instances, wherein the interconnections comprise high speed interconnections that define a high speed cluster network.

24. The system of claim 1 further comprising a web interface to the computer system that makes the computer system available for receiving job requests for execution by the cluster so that the computer system provides High Performance Computing as a Service (HPCaaS).

25. The system of claim 1 wherein the controller is further configured to interconnect the service instances in the cluster based on software-defined networking (SDN).

26. The system of claim 1 wherein the clustering rules include scale rules that mandate a shared filesystem storage dependency for the cluster at a defined size for the cluster.

27. The system of claim 1 wherein the scheduler is carried out by controller logic for the controller.

28. The system of claim 1 wherein the service template includes the clustering rules.

29. The system of claim 1 wherein the resources on which the service instances are deployed include GPU clusters.

30. The system of claim 1 wherein the resources on which the service instances are deployed include mixed hardware with GPU support.

31. The system of claim 1 wherein the resources on which the service instances are deployed include bare metal resources.

32. A method for automating deployment of clusters of clusterable services, the method comprising:
  deploying a service on at least one resource of a computer system based on a service template associated with the service, the computer system having a plurality of resources and an API endpoint associated with the service template, and wherein the service is a clusterable service;
  reading a plurality of clustering rules from the service template, wherein the clustering rules (1) identify a replacement API endpoint and (2) define a condition under which the replacement API endpoint is invoked; and
  automatically scaling up the service to a cluster of services based on the read clustering rules, wherein the automatically scaling includes:
    deploying a plurality of instances of the service on a plurality of the resources, wherein the service instances include interdependent service instances;
    connecting of the service instances as the cluster; and
    configuring a scheduler for management of the cluster, wherein the management of the cluster by the scheduler includes scheduling of tasks for service instances in the cluster.

33. The method of claim 32 wherein the management of the cluster by the scheduler includes load balancing the service instances.

34. The method of claim 32 wherein the computer system further comprises one or more other services that depend on the clusterable service, and wherein the automatically scaling further comprises making the one or more other services depend on the cluster.

35. A computer program product for automating deployment of clusters of clusterable services, the computer program product comprising:
  a non-transitory computer-readable storage medium having a plurality of processor-executable instructions stored thereon, the instructions configured for execution by a processor to cause the processor to:
    deploy a service on at least one resource of a computer system based on a service template associated with the service, the computer system having a plurality of resources and an API endpoint associated with the service template, and wherein the service is a clusterable service;
    read a plurality of clustering rules defined by the service template, wherein the clustering rules (1) identify a replacement API endpoint and (2) define a condition under which the replacement API endpoint is invoked; and
    perform a plurality of operations that automatically scale up the service to a cluster of services based on the read clustering rules, wherein the operations include:
      deployment of a plurality of instances of the service on a plurality of the resources, wherein the service instances include interdependent service instances;
      connection of the service instances as the cluster; and
      configuration of a scheduler for management of the cluster, wherein the management of the cluster by the scheduler includes scheduling of tasks for service instances in the cluster.

* * * * *